(12) United States Patent
Murata et al.

(10) Patent No.: US 6,936,080 B2
(45) Date of Patent: Aug. 30, 2005

(54) METHOD AND DEVICE FOR MANUFACTURING COILED ELECTRODE GROUP

(75) Inventors: Ichiro Murata, Settsu (JP); Masaki Sakoda, Hirakata (JP); Takayuki Aoi, Hirakata (JP); Minoru Koda, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 349 days.

(21) Appl. No.: 10/239,673

(22) PCT Filed: Jan. 28, 2002

(86) PCT No.: PCT/JP02/00619

§ 371 (c)(1),
(2), (4) Date: Sep. 30, 2002

(87) PCT Pub. No.: WO02/061866

PCT Pub. Date: Aug. 8, 2002

(65) Prior Publication Data

US 2003/0140482 A1 Jul. 31, 2003

(30) Foreign Application Priority Data

Jan. 31, 2001 (JP) ........................ 2001-024440

(51) Int. Cl.[7] .............................................. H01M 6/00
(52) U.S. Cl. ..................................... 29/623.1; 29/623.5
(58) Field of Search .............................. 29/623.1, 623.5

(56) References Cited

U.S. PATENT DOCUMENTS 5,718,395 A  2/1998  Nakanose et al.

FOREIGN PATENT DOCUMENTS

| JP | 58-010377 | 1/1983 | |
|----|-----------|--------|---|
| JP | 09-147878 | 6/1997 | |
| JP | 11-336349 | 11/1999 | |
| JP | 2000-251919 | * 9/2000 | .......... H01M/10/04 |
| JP | 2001-216998 | 8/2001 | |
| WO | WO 01/39304 | 5/2001 | |

* cited by examiner

Primary Examiner—Dah-Wei Yuan
(74) Attorney, Agent, or Firm—Jordan and Hamburg LLP

(57) ABSTRACT

A positive electrode plate (8), a negative electrode plate (4), and a separator (7) respectively having lengths required for constituting one spiral electrode group (103) are mounted on individual mount jigs (30, 32, 28) for pulling out or for winding, thereby constituting individual cassettes (29, 31, 27). These individual cassettes (29, 31, 27) are sequentially supplied for, and then mounted on a plurality of group winding head units (20) circulating along a predetermined transportation path. The electrode plates (8, 4) and the separator (7) are wound around a rotationally-driven winding shaft (22) of the group winding head unit (20) while the individual electrode plates (8, 4) supplied from the individual electrode plate cassettes (29, 31) are being positioned at predetermined relative positions on both sides of the separator (7) supplied from the separator cassette (27) in a process for circularly transporting the group winding head units (20).

18 Claims, 11 Drawing Sheets

METHOD AND DEVICE FOR MANUFACTURING COILED ELECTRODE GROUP

TECHNICAL FIELD

The present invention relates to a method and an apparatus for manufacturing a spiral electrode group which is used for a lithium primary battery, for example, and is constituted by winding a positive electrode plate, a negative electrode plate, and a separator interposed therebetween in a spiral shape while they are being laminated.

BACKGROUND ART

Small, high-capacity, and cylindrical lithium primary batteries, and various types of rechargeable batteries have been used as a drive power supply for portable electric devices such as a camera. A higher voltage and a higher capacity are required for these batteries as the portable electric devices have higher performance and more sophisticated functions. To satisfy these requirements, batteries constituted by a spiral electrode group formed by winding laminated positive electrode plate, negative electrode plate, and separator interposed therebetween into a spiral shape are widely and generally used. For securing high performance and uniform quality as well as increasing productivity of the spiral electrode group for the various types of cylindrical batteries, it is important to wind the electrode plates and the separator in a spiral shape while eliminating a winding displacement between the positive and negative electrode plates and the separator, preventing an elongated state caused by an abnormally strong tensile force applied on the electrode plates and the separator, and avoiding slack of the electrode plates and the separator.

In view of the foregoing, the present applicant previously proposed an apparatus for manufacturing a spiral electrode group with the high performance and the uniform quality described above (see Japanese Patent Laid-Open Publication No. Hei. 09-147878). In this manufacturing apparatus, a belt-shape separator is divided into a first region on one side and a second region on the other side at the center. The first region is held between positive and negative electrode plates. A winding shaft engaged at a boundary between both the regions folds the separator into two so as to wind the electrode plates and the separator into a spiral shape while the first and second regions are respectively sucked by first and second suction means. Thus, the spiral electrode group is manufactured while feeding means are moving the first and second regions sucked and held by individual endless belts of the first and second suction means toward the winding shaft from the both sides, thereby preventing an excessive tensile force from being applied to the separator and the like constituting the spiral electrode group, and simultaneously rotational feeding speeds of the endless belts are being controlled so as to optimize the tensile force, thereby enabling to manufacture a spiral electrode group while preventing a generation of elongation of the separator and the like, and a generation of displaced winding between the positive and negative electrode plates.

When this apparatus for manufacturing a spiral electrode group is used for manufacturing a spiral electrode group for a nickel-cadmium battery or a nickel-metal hydride battery, since positive and negative electrode plates have relatively large tensile strength, and high resistance against a tensile force applied in winding, and separator, which tends to undergo the influence from the tensile force most, has a certain degree of resistance against and recoverability from elongation in both of these types of batteries, a relatively excellent spiral electrode group can be obtained. However, when a spiral electrode group for a cylindrical lithium primary battery and the like is manufactured, since a lithium metal foil tape in a belt shape constituting a negative electrode plate has extremely small resistance against a tensile force, the tape tends to generate a plastic deformation, thereby being elongated by a slight tensile force, resulting in a change in the shape and the dimension of the spiral electrode group. Thus, a battery using this spiral electrode group generates a decrease and a variation of battery characteristics.

On the other hand, the lithium metal foil tape may be wound while a tensile force is hardly applied to the tape. However, since the belt-shape lithium metal foil tape has a very soft surface, and thus the tape tends to present a plastic deformation, when the tape is pressed to or slid on the surface of the metal in a contact state, the tape tends to adhere to the surface of various types of metal. Thus, the constitution of the manufacturing apparatus described above cannot securely wind a thin belt-shape lithium metal foil tape without applying a tensile force, and generating slack. As a result, since a manufactured spiral electrode group is very loosely wound as an electrode group, the electrode group is so unstable to present a change in the shape and the dimension, thereby causing a tendency of a displacement in the winding. Thus, the present applicant previously proposed an apparatus for manufacturing a spiral electrode group which winds constituting materials while automatically adjusting the feeding speed variably to an optimal one which does not apply an unnecessarily high tensile force according to a variation in thickness of the materials such as electrode plates (Japanese Patent Laid-Open Publication No. Hei. 11-336349). In this manufacturing apparatus, as shown in a schematic front view in FIG. 11, a rotation table 1 including three winding cores 2 provided on the outer periphery at an interval of 120° rotates by an intermittent increment of 120° in a direction indicated by an arrow in the drawing, thereby sequentially moving the three winding cores 2 for positioning to a winding position P where the winding core 2 comes in contact with a tape suction drum 3. The winding core 2 is rotationally driven at the winding position P to wind a negative electrode plate 4, a separator 7, and a positive electrode plate 8 in a spiral shape while receiving the negative electrode plate 4 from the tape suction drum 3, thereby manufacturing a spiral electrode group 9.

Linear guides 10 are respectively provided between the individual neighboring two winding cores 2 of the three winding cores 2. A guiding chuck member 11 and a positioning chuck member (not shown) are respectively provided so as to smoothly slide with almost no slide load received on the individual guides 10. The guiding chuck member 11 chucks an end of the separator 7 so as to pass through an engagement slit (not shown) in the winding core 2. The positioning chuck member chucks an end of the positive electrode plate 8 while the positive electrode plate 8 is laminated on, and positioned with respect to the separator 7, and then feeds the positive electrode plate 8 in a predetermined positioned state with respect to the negative electrode plate 4 to the winding core 2 while the positioning chuck member is sliding on the guide 10 as the separator 7 being wound on the winding core 2 is transported. When the winding core 2 rotates for winding, the guiding chuck member 11 on the left side with respect to the winding core 2 in the drawing moves upward along the guide 10 as the winding core 2 rotates for winding, thereby serving for the winding core 2 as a weight for applying a proper tensile force to the separator 7. Similarly, the guiding chuck member 11 on the right side with respect to the winding core 2 in the drawing serves for the winding core 2 as a weight for applying a proper tensile force to the positive electrode plate 8.

On the other hand, the plurality of tape suction drums 3 are provided at an equal interval on an outer periphery of a transporting rotation drum (not shown), and are not connected with a rotationally driving source, but are rotatably supported by rotation support shaft 12. Simultaneously, an extremely weak braking force as large as preventing a continuous rotation by an inertia force is applied to the tape suction drums 3. The negative electrode plate 4, which is formed as a thin belt-shape lithium metal foil tape, and is cut into a predetermined length required for constituting the one spiral electrode group 9, is sucked and held on the outer peripheral surface of the tape suction drum 3 in advance in a wound state. Simultaneously, the tape suction drums 3 are sequentially transported to the winding position P by an intermittent rotation of the transporting rotation drum, and then is pressed against the winding core 2 with a proper force by a drum support lever 14 rotated and urged by a helical spring 13 toward a direction indicated by an arrow in the drawing.

In this manufacturing apparatus, when the winding core 2 rotates, the tape suction drum 3 in contact with the winding core 2 is rotated together in synchronism with the winding core 2 only by a friction force generated by the contact with the winding core 2. As a result of the rotation, the negative electrode plate 4 sucked and held on the outer peripheral surface of the tape suction drum 3 is wound together with portions of the separator 7. Thus, since a tensile force is hardly applied to the negative electrode plate 4 sucked and held on the tape suction drum 3 supported rotatably, though the negative electrode plate 4 is a thin lithium metal foil tape, it is not elongated. Also,- since the tape suction drum 3 rotates through the drum support lever 14 as the diameter of the spiral electrode group 9 changes, the rotation speed of the tape suction drum 3 automatically increases so as to be always variably adjusted to a stable optimal value as the diameter of the spiral electrode group 9 increases though the winding core 2 always rotates at a constant speed. As a result, since a tensile force is hardly applied to the negative electrode plate 4 in the winding process for the spiral electrode group 9, the negative electrode plate 4 is not elongated.

In the manufacturing apparatus described above, the tape suction drum 3 rotatably supported is rotated together in synchronism with the winding core 2 by the friction force acting between the negative electrode plate 4 sucked and held on the outer peripheral surface of the tape suction drum 3 and the outer peripheral surface of the winding core 2 or the separator 7, though the negative electrode plate 4 is a thin lithium metal foil tape, it is not elongated. Thus, the spiral electrode group 9 with a required shape is surely manufactured. However, this manufacturing apparatus is not proper for mass-producing the spiral electrode group 9 at high productivity.

Namely, in this manufacturing apparatus, the negative electrode plate 4 is cut into a predetermined dimension after a positioning tape and a negative electrode lead are attached at a negative electrode plate supplying part (not shown) additionally provided for this apparatus, the separator 7 is cut into a predetermined dimension at a separator supplying part additionally provided for the apparatus, and the positive electrode plate 8 is cut into a predetermined dimension after a positive electrode lead is attached at a positive electrode plate supply part additionally provided for the apparatus. Then, after the negative electrode plate 4, the separator 7, and the positive electrode plate 8 are supplied so as to have required relative positions with respect to the winding core 2 transported to the single winding position P, the winding is conducted at this winding position P. In this way, in this manufacturing apparatus, the individual constituting materials for the spiral electrode group 9 are supplied at the single winding position P so as to be assembled at the predetermined relative positions after these materials are made into the predetermined shapes at the individual supplying parts additionally provided for this apparatus, and then these materials are wound into the spiral shape. Thus, it is not possible to supply the positive electrode plate 8, the negative electrode plate 4, and the separator 7 until a next winding core 2 is transported to the winding position P after one spiral electrode group 9 has been manufactured at the winding position P. Thus, the increase of the productivity is limited.

In addition, this manufacturing apparatus is constituted such that the negative electrode plate 4 with a predetermined length required for constituting one spiral electrode group 9 is maintained in the wound state on the tape suction drum 3 while the entire part in the lengthwise direction is vacuum-sucked. Simultaneously the separator 7 is wound by the winding core 2 while the proper tensile force is applied to the separator 7 by slidingly moving the guiding chuck members 11 along the guides 10 after the both ends of the separator 7 with a predetermined length for constituting one spiral electrode group 9 are chucked by the guiding chuck members 11. Thus, in this manufacturing apparatus, since it is necessary to use the tape suction drum 3 with a diameter corresponding to the length of the negative electrode plate 4, and the guides 10 with a length corresponding to the length of the separator 7, the apparatus should be a dedicated apparatus for manufacturing a spiral electrode group 9 for a specific battery. Consequently, it is necessary to individually prepare the apparatuses for the different types of spiral electrode groups different in length and width of the positive electrode plate 8, the negative electrode plate 4, and the separator 7, resulting in increasing the cost.

The present invention is devised in light of the foregoing, and an object of the invention is to provide a manufacturing method and a manufacturing apparatus for highly precisely and highly productively manufacturing various spiral electrode groups different in length and width of the positive and negative electrode plates and the separator on a single apparatus.

DISCLOSURE OF THE INVENTION

To attain the object above, a method for manufacturing a spiral electrode group of the present invention includes: constituting a positive electrode plate cassette, a negative electrode plate cassette, and a separator cassette by mounting a positive electrode plate, a negative electrode plate, and a separator with lengths necessary for constituting one spiral electrode group respectively on appositive electrode plate mount jig, a negative electrode plate mount jig, and a separator mount jig for pulling out, or for winding; sequentially supplying a plurality of group winding head units circulating along a predetermined transportation path with the positive electrode plate cassette, the negative electrode plate cassette, and the separator cassette respectively, thereby mounting these cassettes on the head units; positioning individual ends of the positive electrode plate and the negative electrode plate to predetermined relative positions in the process for circularly transporting the group winding head units, the positive electrode plate and the negative electrode plate respectively supplied from the positive electrode plate cassette and the negative electrode plate cassette to predetermined positions in the lengthwise direction on the both sides of the separator in the separator cassette; and winding the positive electrode plate, the negative electrode plate, and the separator around a rotationally-driven winding shaft of the group winding head unit while the positive electrode plate, the negative electrode plate, and the separator are being laminated.

In this method for manufacturing a spiral electrode group, after both of the electrode plates and the separator are constituted as the cassettes for pulling out or winding, and then these individual cassettes are sequentially mounted on the plurality of group winding head units circulating along the transportation path, the individual units wind both of the electrode plates and the separator while they are being laminated in the process of circulating the plurality of group winding head units along the transportation path, thereby manufacturing spiral electrode groups. Thus, since the spiral electrode groups are simultaneously wound at a plurality of locations, the productivity increases remarkably compared with a case where the spiral electrode group is wound at a single location.

An apparatus for manufacturing a spiral electrode group of the present invention includes: a negative electrode plate cassette formed by winding one electrode plate of belt-shape electrode plates with predetermined lengths by multiple turns on an outer peripheral surface of a drum supported rotatably, and simultaneously by maintaining the electrode plate in a wound state on the drum while the electrode plate is locked by a separable lock member in contact with a wound end of the electrode plate against slack; a positive electrode plate cassette for holding the other electrode plate of the belt-shape electrode plates with the predetermined lengths in a pullable manner; a separator cassette which includes a pair of winding shafts which are rotatably supported in parallel with each other, and maintains a separator while both ends in the lengthwise direction of the separator with a predetermined length are engaged with engagement slits formed along the shaft center of the pair of individual winding shafts, and simultaneously portions of the separator divided according to the lengths of the positive electrode plate and the negative electrode plate are respectively wound on the pair of winding shafts; and a plurality of group winding head units provided for circulating along a circular transportation path. The manufacturing apparatus is constituted such that a spiral electrode group is formed by sequentially mounting the positive electrode plate cassette, the negative electrode plate cassette, and the separator cassette on the individual group winding head units at a supply position on the transportation path, supplying the positive electrode plate and negative electrode plate to predetermined positions on the both sides of the separator in contact with the winding shaft of the individual group winding head unit, positioning ends of the positive electrode plate and negative electrode plate to predetermined relative positions, and winding the positive electrode plate, the negative electrode plate, and the separator on the winding shaft rotationally driven while the positive electrode plate, the negative electrode plate, and the separator are being laminated in a process of circulating the group winding head units on the path.

An alternative apparatus for manufacturing a spiral electrode group of the present invention includes: positive and negative electrode plate cassettes formed by winding electrode plates with predetermined lengths by multiple turns on an outer peripheral surface of drums supported rotatably, and simultaneously by maintaining the electrode plates in the wound state on the drums while the electrode plates are locked by separable lock members in contact with a wound end of the electrode plates against slack; a separator cassette which includes a pair of winding shafts rotatably supported in parallel with each other, and maintains the separator while both ends in the lengthwise direction of the separator with a predetermined length are engaged with engagement slits formed along the shaft center of the pair of individual winding shafts, and simultaneously portions of the separator divided according to the lengths of the positive electrode plate and the negative electrode plate are respectively wound on the pair of winding-shafts; and a plurality of group winding head units provided for circulating along a circular transportation path. The manufacturing apparatus is constituted such that a spiral electrode group is formed by sequentially mounting the positive electrode plate cassette, the negative electrode plate cassette, and the separator cassette on the individual group winding head units at a supply position on the transportation path, supplying the positive electrode plate and negative electrode plate to predetermined positions on the both sides of the separator in contact with a winding shaft of the individual group winding head unit, positioning the ends of the positive electrode plate and negative electrode plate to predetermined relative positions, and winding the positive electrode plate, the negative electrode plate, and the separator on the winding shaft rotationally driven while the positive electrode plate, the negative electrode plate, and the separator are being laminated in a process of circulating the group winding head units on the path.

In these apparatuses for manufacturing a spiral electrode group, the electrode plate cassettes and the separator cassette are easily mounted on the group winding head unit, and simultaneously a spiral electrode group is manufactured at high precision by interposing the separator between the electrode plates smoothly pulled out from the electrode plate cassettes while the separator is being wound on the winding shaft.

BEST MODE FOR CARRYING OUT THE INVENTION

Figure 1:
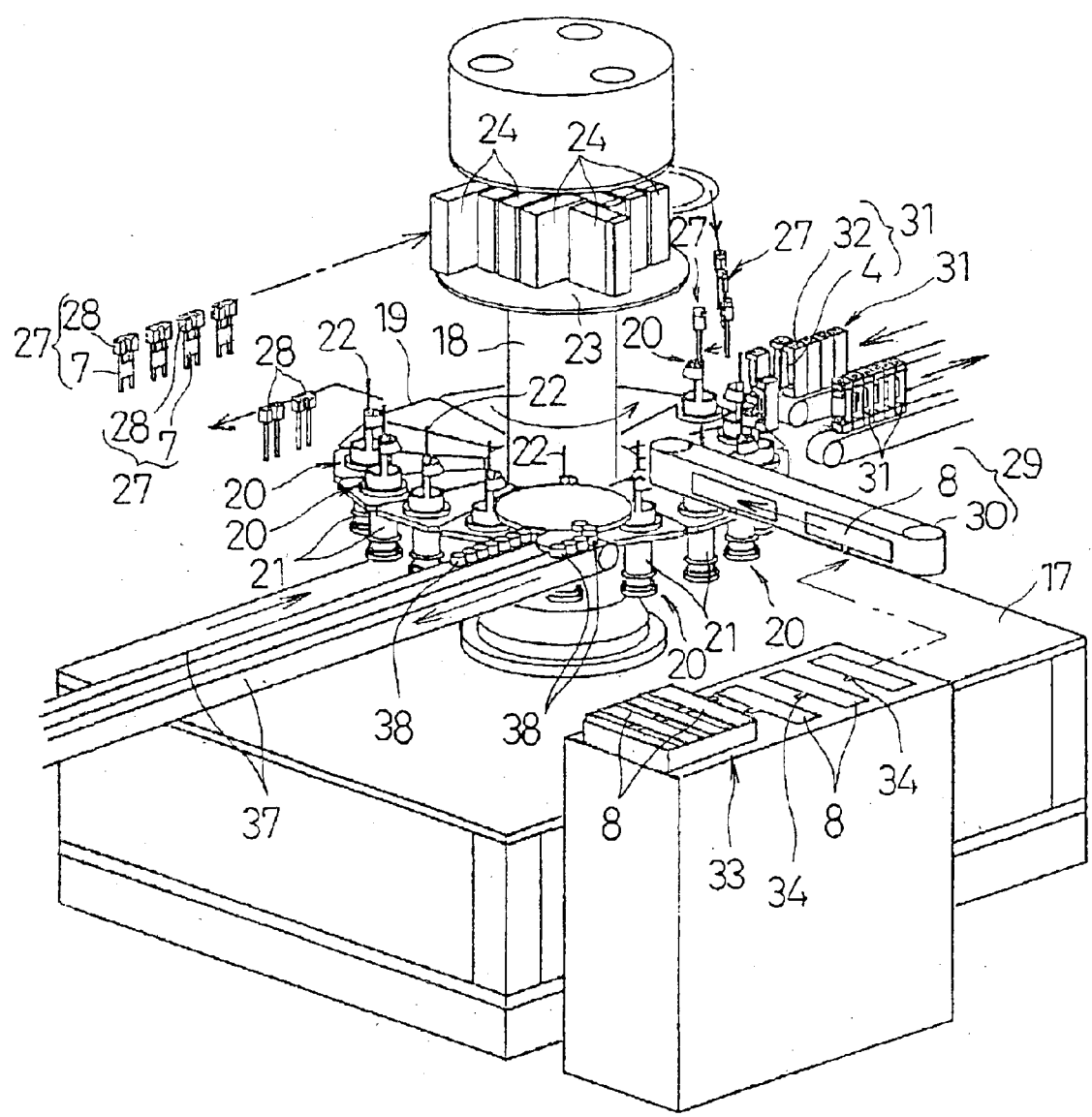
FIG. 1 is a perspective view of a principal part showing a manufacturing apparatus embodying a method for manufacturing a spiral electrode group according to a first embodiment of the present invention.

The following section describes preferred embodiments of the present invention while referring to drawings. FIG. 1 is a perspective view of a principal part showing a manufacturing apparatus embodying a method for manufacturing a spiral electrode group according to a first embodiment of the invention. This embodiment exemplifies the apparatus for manufacturing a spiral electrode group for a lithium primary battery.

In this drawing, this manufacturing apparatus includes a rotating support pillar 18 which is erected on an apparatus base 17, and is rotated in a direction indicated by an arrow in the drawing, a work table 19 which is fixed to a lower outer peripheral surface of the rotating support pillar 18, and integrally rotates with the pillar 18, and a plurality (such as 16) of group winding head units 20 provided at an equal interval along the outer peripheral end of the work table 19. The group winding head unit 20 is constituted by a servomotor (a drive source) 21 provided on a bottom surface of the work table 19, a winding shaft 22 which is erected on the top surface of the work table 19, and is rotationally driven by the servomotor 21, and other elements. A plurality of servo controllers 24 for individually controlling the servomotors 21 for the individual group winding head units 20 are provided on a support shelf 23 fixed to an upper part of the rotating support pillar 18. Thus, the plurality of group winding head units 20 circulate along a circular transportation path as the work table 19 rotates intermittently.

When the individual group winding head units 20 reach a predetermined position as the work table 19 rotates, a separator cassette 27 formed by winding a separator 7 with a predetermined length required for constituting one spiral electrode group on a separator mount jig 28, a positive electrode plate cassette 29 formed by mounting a positive electrode plate 8 with a predetermined length required for constituting one spiral electrode group to a positive electrode plate mount jig 30, and a negative electrode plate cassette 31 formed by winding a negative electrode plate 4 made of a thin lithium metal foil tape with a predetermined length required for constituting one spiral electrode group on a negative electrode plate mount jig 32 are individually supplied.

A chuck member of a robot mechanism (not shown) transports the supplied positive electrode plate 8 so as to be sucked and held by the positive electrode plate mount jig 30 after the positive electrode plate 8 is processed into a state ready for constituting one spiral electrode group by cutting into the predetermined length, and by attaching a positive electrode lead 34 to a predetermined position in a positive electrode plate processing mechanism 33. Then, the positive electrode plate 8 and the positive electrode plate mount jig 30 are supplied as the positive electrode plate cassette 29 for the group winding head unit 20. Since the positive electrode plate 8 constituting the spiral shape electrode group for a lithium primary battery manufactured in the present embodiment is constituted by a ferromagnetic stainless steel as a core material, and the positive electrode plate 8 has a relatively high stiffness, the positive electrode plate 8 is easily handled as a plate-shape member, and simultaneously can be transported while magnetically attached by a magnet as described later. These are the reasons for constituting the positive electrode plate cassette 29 in this way.

After the separator cassette 27 and the negative electrode plate cassette 31 are processed into predetermined constitutions respectively by a separator processing mechanism 77 shown in FIG. 4A to FIG. 4C, and a negative electrode plate processing mechanism 59 shown in FIG. 3 as described later, they are supplied for the group winding head unit 20 as shown by arrows in the drawing. After the separator mount jig 28 and the negative electrode plate mount jig 32 have supplied the separator 7 and the negative electrode plate 4 respectively for the group winding head unit 20, the empty separator,mount jig 28 and negative electrode plate mount jig 32 are detached from the group winding head unit 20 when they are transported to predetermined positions as the work table 19 rotates, and then they are transported to return to the processing mechanisms 77 and 59 respectively. This procedure is detailed later. The spiral electrode group (not shown) constituted by winding the separator 7, the positive electrode plate 8, and the negative electrode plate 4 is taken out while the spiral electrode group is stored in a transportation container 38 circularly transported along a transportation conveyer 37, and then is transported to a next process.

Figure 2A:
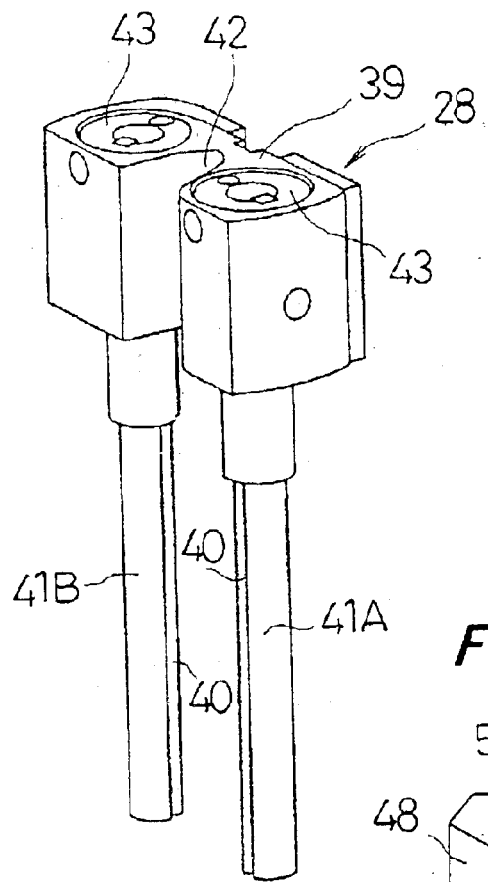
FIG. 2A, FIG. 2B, and FIG. 2C are perspective views respectively showing a separator mount jig, a negative electrode plate mount jig, and a positive electrode plate mount jig used for this manufacturing apparatus.
Figure 2B:
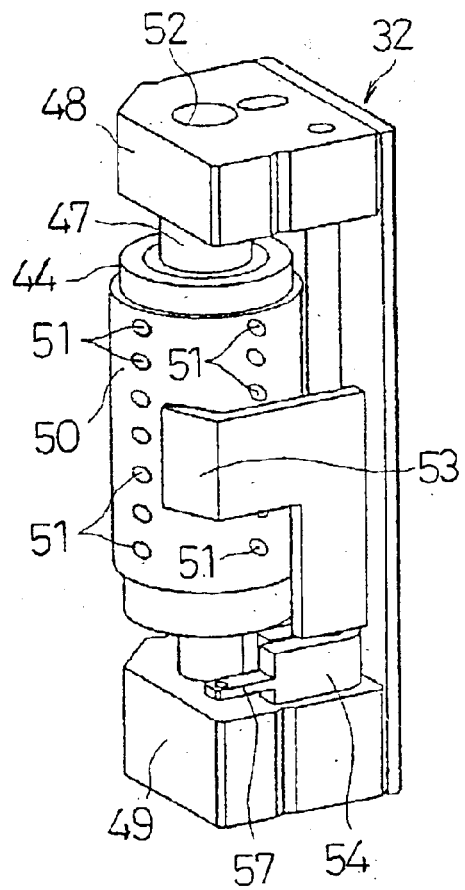
Figure 2C:
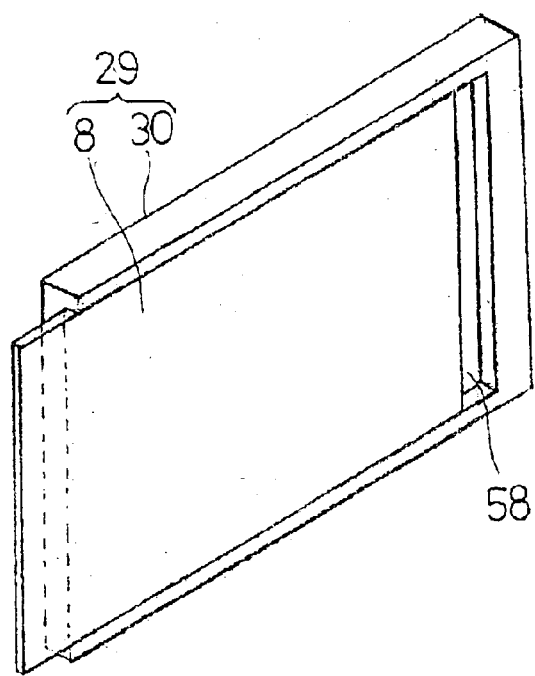

FIG. 2A to FIG. 2C are perspective views respectively showing the separator mount jig 28, the negative electrode plate mount jig 32, and the positive electrode plate mount jig 29. First, the separator mount jig 28 in FIG. 2A has such a constitution that a pair of winding shafts 41A and 41B including an engagement slit 40 along the shaft center are provided in parallel with each other, the individual top ends of the winding shafts 41A and 41B are supported rotatably by a main unit 39, and a holder recess 42 in a groove shape extending in the shaft direction (in the up/down direction in the drawing) is provided at the center of the main unit 39.

The pair of winding shafts 41A and 41B are rotatably supported respectively by bearings (not shown) in the main unit 39. However, a braking force is applied such that the separator 7 wound on the winding shafts 41A and 41B so as to be mounted between them is maintained without generating slack, elongation, and crease as long as a force is not applied to the separator 7.

Also, connection shafts 43 with a diameter larger than that of the winding shafts 41A and 41B are respectively connected with the top end of the pair of winding shafts 41A and 41B. The connection shafts 43 are rotatably engaged with the main unit 39 such that the top ends are exposed so as to be connected with external rotation shafts (not shown). Thus, the pair of winding shafts 41A and 41B are rotationally driven from the outside by engagingly connecting the rotation shafts of a driving source with the connecting shafts 43.

In the negative electrode plate mount jig 32 in FIG. 2B, a drum 44 for winding the negative electrode plate 4 is externally and rotatably engaged through a bearing (not shown) with a support shaft 47 fixed between top and bottom support bases 48 and 49. A ring 50 made of urethane rubber or the like is externally and fixedly engaged with the outer peripheral surface of the drum 44 for surely winding the negative electrode plate 4. A plurality of vacuum suction holes 51 are formed as multiple rows of holes arranged on a single line in the axial direction of the support shaft 47 on this ring 50.

The individual vacuum suction holes 51 respectively communicate with connection holes (not shown) formed inside the drum 44. Further, the connection holes communicate with a coupling hole 52 formed from the top and bottom ends inside the support shaft 47. These holes constitute a vacuum circuit. In addition, though the drum 44 is rotatably supported by the support shaft 47, an extremely weak braking force is applied against a continuous rotation generated by an inertia force. Further, an action lever 54 with which a lock lever (a lock member) 53 is connected for integral rotation is rotatably supported by the bottom support base 49. The action lever 54 is always rotated and urged by a spring (not shown) inward for bringing the lock lever 53 in contact with the drum 44. Simultaneously, an action piece 57 for receiving a rotational operation force toward a direction for departing the lock lever 53 from the drum 44 is integrally protruded from the action lever 54.

The positive electrode plate mount jig 30 in FIG. 2C has a shape including a holding recess 58 with which the positive electrode plate 8 with the predetermine length is fit and held slidingly and suckingly. Thus, the positive electrode plate 8 brought to be fit to the holding recess 58 by the chuck member of the robot mechanism as described above is slid in a direction indicated by an arrow in FIG. 1 to be supplied to the predetermined position toward the group winding head unit 20.

Figure 3:
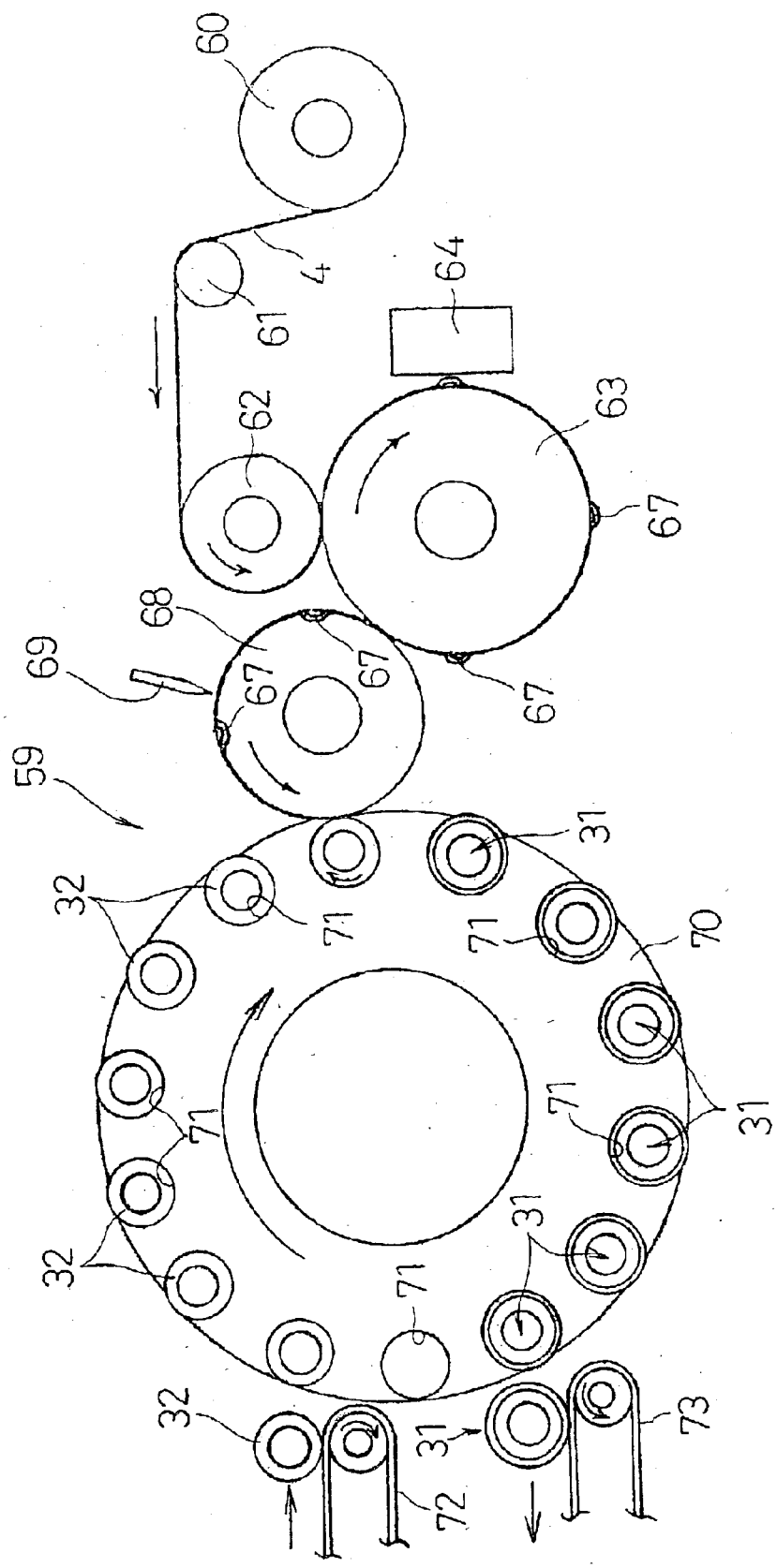
FIG. 3 is a schematic front view showing an overall constitution of a negative electrode plate processing mechanism for this manufacturing apparatus.

FIG. 3 is a schematic front view showing an overall constitution of the negative electrode plate processing mechanism 59 which constitutes the negative electrode plate cassette 31 by winding the negative electrode plate 4 on the negative electrode plate mount jig 32. In this drawing, the negative electrode plate 4 made of a thin belt-shape lithium metal foil tape is transported while being wound on an outer peripheral surface of an installation drum 63 through a guide roller 61 and a support roller 62 after reeled out from a supply roll 60. When the negative electrode plate 4 passes an installation station 64 as the installation drum 63 rotates, a positioning tape (not shown), a negative electrode lead 67, an outer periphery tape (not shown), and the like are individually attached at predetermined positions. Further, the negative electrode plate 4 is transported from the installation drum 63 to be wound on an outer peripheral surface of a tape supply drum 68. A cutter 69 cuts the negative electrode plate 4 into a length required for constituting one spiral electrode group during this transportation while the negative electrode plate 4 is being wound on the tape supply drum 68.

A large number of holders 71 for holding the negative electrode plate mount jig 32 or the negative electrode plate cassette 31 are provided at an equal interval on a single circle along the outer peripheral edge of a tape mount drum 70 provided close to the tape supply drum 68. The tape mount drum 70 is intermittently rotated by a constant angle increment corresponding to the placement pitch of the holders 71 in a direction indicated by an arrow in the drawing. The tape mount drum 70 intermittently rotates to transport,the negative electrode plate mount jig 32 to the tape supply drum 68 after the individual holders 71 sequentially receive the negative electrode plate mount jigs 32 transported by a transportation conveyer (a transportation mechanism) 72 such as a magnet conveyer. When the tape mount drum 70 stops after the negative electrode plate mount jig 32 reaches the tape supply drum 68, the tape mount drum 70 sequentially brings the ring 50 of the drum 44 in the negative electrode plate mount jig 32 in contact with the tape supply drum 68. With this operation, the negative electrode plate 4 with the predetermined length supplied from the tape supply drum 68 is wound on the outer peripheral surface of the ring 50 in the negative electrode plate mount jig 32, and consequently the negative electrode plate cassette 31 is constituted. Then, the tape mount drum 70 transports the negative electrode plate cassette 31 while rotating intermittently, and consequently feeds out the negative electrode plate cassette 31 to a supply conveyer (a supply mechanism) 73. The supply conveyer 73 transports the negative electrode plate cassette 31 to the group winding head unit 20.

The following section details the operation of winding the negative electrode plate 4 on the outer peripheral surface of the ring 50 in the negative electrode plate mount jig 32, where the negative electrode plate 4 has the predetermined length, and is wound on the tape supply drum 68. When the negative electrode plate mount jig 32 is transported inside the holder 71 of the tape mount drum 70 from the transportation conveyer 72, and then is held in the holder 71, the action piece 57 comes in contact with a pressing protrusion (not shown) on the holder 71, and subsequently receives a mechanical pressing force. As a result, the action lever 54 rotates against the urging force from the spring, and the lock lever 53 subsequently departs from the ring 50 of the drum 44, and is maintained in this departed state.

Further, the negative electrode plate mount jig 32 in the holder 71 is maintained in a state where a predetermined row of the vacuum suction holes 51 is positioned at the outermost location, and is transported to the tape supply drum 68 while maintaining this state as the tape mount drum 70 intermittently rotates. When the negative electrode plate mount jig 32 is transported to the tape supply position, and then the ring 50 comes in contact with the tape supply drum 68, the vacuum suction holes 51 in the row which is in contact with the tape supply drum 68 are connected with a vacuum source (not shown) such as a vacuum pump through the vacuum circuit in the holder 71.

As described above, the leading end in the transportation direction (the trailing end for constituting the spiral electrode group) of the negative electrode plate 4 which has the predetermined length, and is wound on the tape supply drum 68 is sucked on the ring 50 of the negative electrode plate mount jig 32 through the vacuum suction holes 51 connected with the vacuum source. Then, the drum 44 rotatably supported in the negative electrode plate mount jig 32 winds the negative electrode plate 4 supplied from the tape supply drum 68 on the outer peripheral surface of the ring 50 while the drum 44 is being rotated together in synchronism with the tape supply drum 68 by a friction force generated from the contact between the ring 50 and the tape supply drum 6B through the negative electrode plate 4. Since almost no tensile force is applied to the negative electrode plate 4 moved from the tape supply drum 68 to the drum 44, though the negative electrode plate 4 is the thin lithium metal foil tape, the negative electrode plate 4 is wound on the ring 50 of the drum 44 without presenting elongation.

Figure 5:
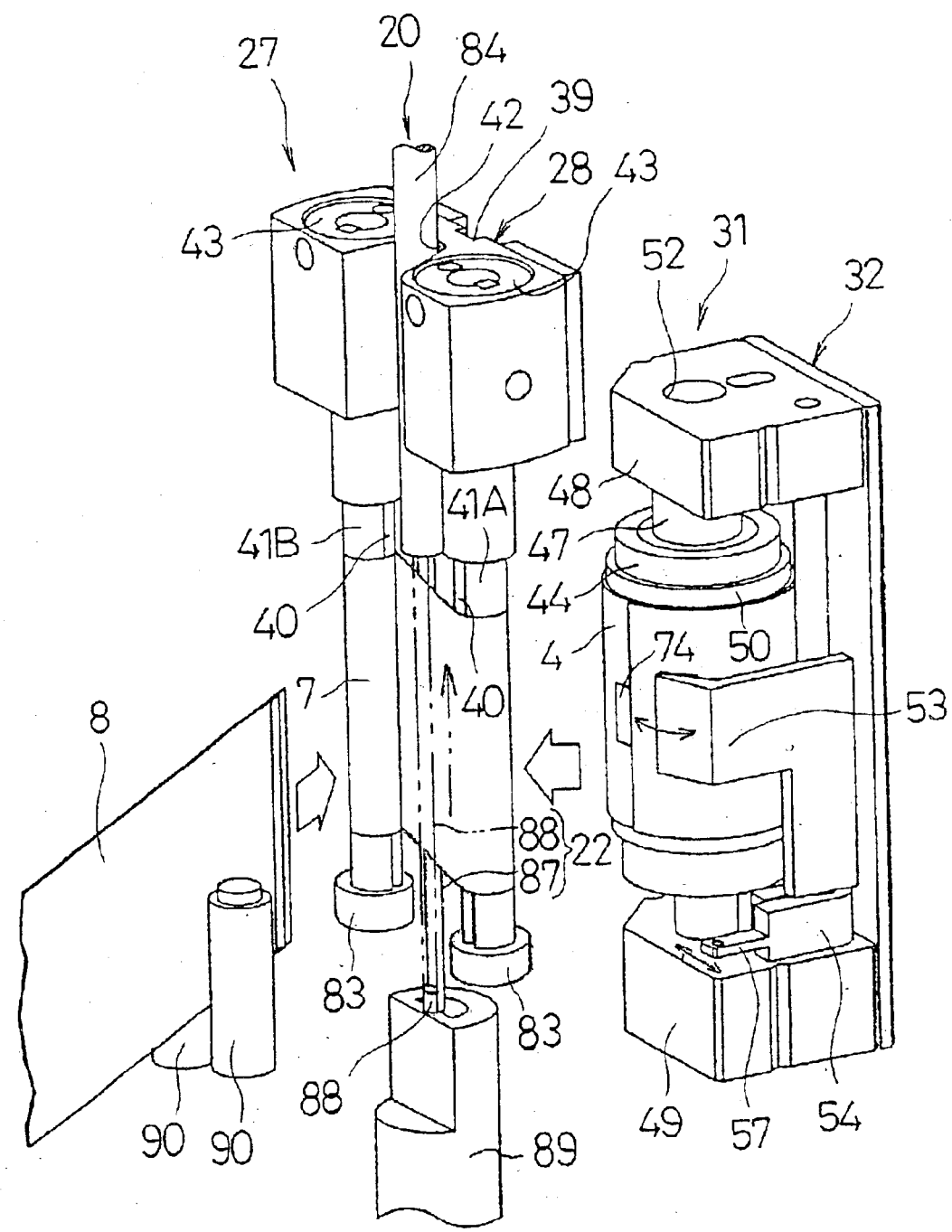
FIG. 5 is a perspective view showing a relative positional relationship among a positive electrode plate cassette, a negative electrode plate cassette, and the separator cassette supplied for a group winding head unit in this apparatus.

The negative electrode plate 4 with the predetermined length is wound by multiple times, twice for example, on the ring 50 of the drum 44. When winding the negative electrode plate 4 on the ring 50 is finished, the pressing force on the action piece 57 from the pressing protrusion is released. As a result, the lock lever 53 is rotated inward by the urging force of the spring always acting on the action lever 54, and consequently lightly presses the wound end of the negative electrode plate 4 wound on the ring 50 as shown in FIG. 5. Consequently, the negative electrode plate 4 which has the predetermined length, and is wound on the ring 50 of the drum 44 maintains the wound state after the vacuum suction force through the vacuum suction holes 51 is released, and thus the negative electrode plate cassette 31 where the negative electrode plate 4 with the predetermined length is wound on the negative electrode plate mount jig 32 shown in FIG. 5 is completed. The wound end of the negative electrode plate 4 in pressure contact with the lock lever 53 is the leading end for constituting the spiral electrode group. The positioning tape 74 is adhered to the leading end of the negative electrode plate 4 such that an adhesive-layer-formed surface of the positioning tape 74 is facing outward.

The negative electrode plate cassette 31 where the negative electrode plate 4 with the predetermined length is wound on the negative electrode plate mount jig 32 can be handled as an independent single part. After the negative electrode plate cassette 31 is transported to the delivery position as the tape mount drum 70 intermittently rotates, the negative electrode plate cassette 31 is moved to the supply conveyer 73 as shown in FIG. 3. Then, the negative electrode plate cassettes 31 are sequentially transported to the group winding head unit 20 as the supply conveyer 73 is circularly fed. Since this negative electrode plate cassette 31 is constituted such that the negative electrode plate 4 is wound on the ring 50 of the drum 44 by multiple turns, and then the lock lever 53 is pressed on the wound end of the negative electrode plate 4 for maintaining the negative electrode plate 4 in the wound state against slack, this constitution provides such advantage that the same negative electrode plate mount jig 32 is shared for constituting the negative electrode plate cassette 31 among various negative electrode plates 4 different in length and width corresponding to difference in type and size of batteries.

Figure 4A:
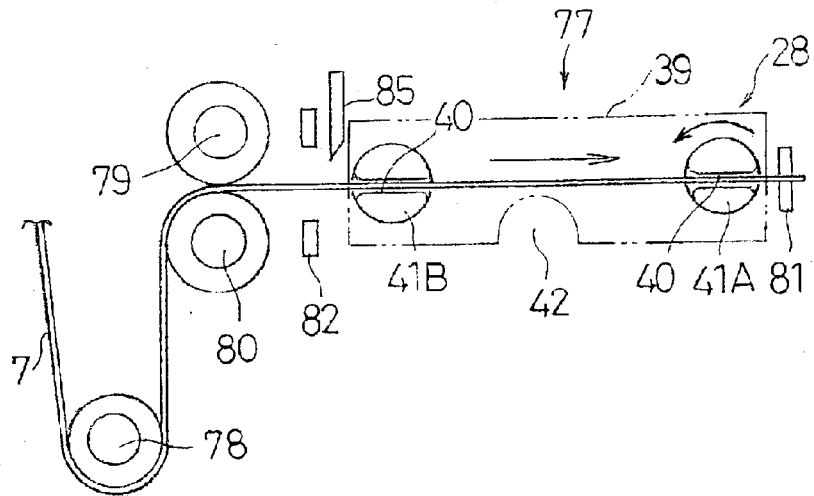
FIG. 4A to FIG. 4C are process drawings arranged in the order of process, and schematically showing a manufacturing process for constituting a separator cassette at a separator processing mechanism for this apparatus.
Figure 4B:
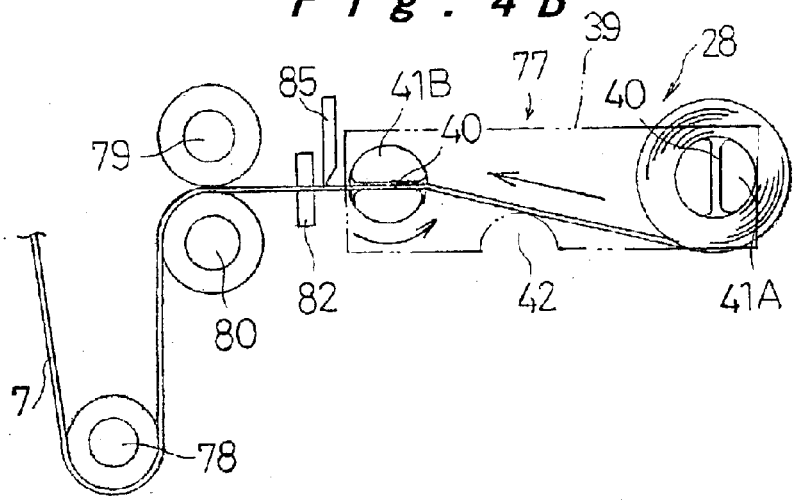
Figure 4C:
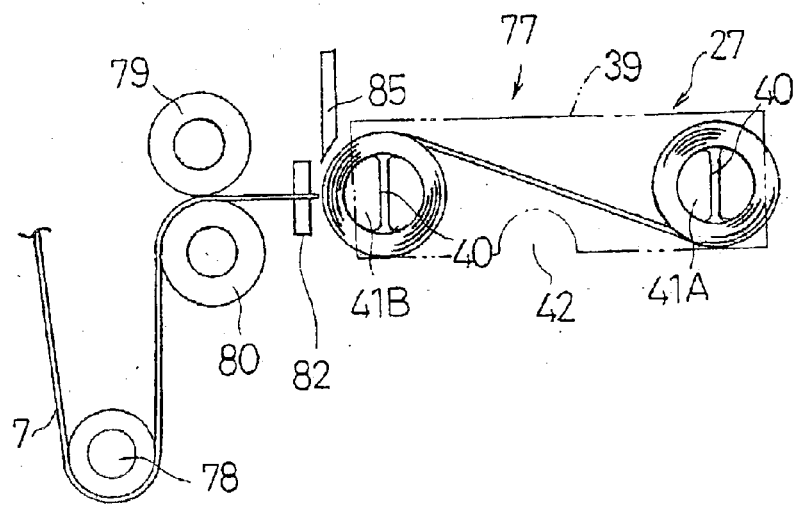

FIG. 4A to FIG. 4C are process drawings arranged in the order of process, and schematically showing a manufacturing process for constituting the separator cassette 27 by winding the separator 7 on the separator mount jig 28 in the separator processing mechanism 77. The belt-shape separator 7 is led to between a pair of guide rollers.(guide members) 79 and 80 while a tension roller (a tensioning member) 78 is applying a required tensile force to the separator 7 after the separator 7 is fed out from a supply roll (not shown) serving as a supply source. When the separator mount jig 28 is transported from the group winding head unit 20 to the separator processing mechanism 77 after supplying the separator 7, the separator mount jig 28 sequentially comes to be held by a holder (not shown) in the separator mount drum (not shown) in the separator processing mechanism 77.

The separator mount drum is similar to the tape mount drum 70 described in the section for the negative electrode plate processing mechanism 59. When the separator mount jig 28 comes to be held by the holder of the separator mount drum, drive shafts provided in the holder of the separator mount drum are individually connected with the pair of connection shafts 43 in FIG. 5, thereby realizing a state where the pair of winding shafts 41A and 41B are rotated through the connection shafts 43.

The pair of winding shafts 41A and 41B of the separator mount jig 28 held by the holder of the separator mount drum is retracted upward at the beginning. In this state, a chuck member on a pulling side (a chuck member) 81 chucks the end of the separator 7 led out from between the guide rollers 79 and 80, and then transports it to a position shown in FIG. 4A. Then, when -the pair of winding shafts 41A and 41B moves down, the separator 7 led out from between the guide rollers 79 and 80 is passed through individual engagement slits 40 of the pair of winding shafts 41A and 41B of the separator mount jig 28. Then, the winding shaft 41A on one side of the separator mount jig 28 is driven to start rotating by the drive shaft, and almost simultaneously, the pulling chuck member 81 releases the chucking of the separator 7. As a result, the winding shaft 41A on the one side starts winding the separator 7.

The winding shaft 41A on the one side stops winding when the separator 7 with a length required for constituting one spiral electrode group is pulled out from between the guide rollers 79 and 80. Then, in a state where a part led out from between the guide rollers 79 and 80 is chucked by a chuck member 82 on a holding side, the separator 7 is cut by a cutter 85 at a position on a leading side of the chucked part as shown in FIG. 4B, thereby having the predetermined length required for constituting one spiral electrode group. Then, the winding shaft 41B on the other side is rotationally driven in a direction indicated by an arrow in the drawing, and consequently the predetermined-length separator 7 is wound out from the winding shaft 41A on the one side, and simultaneously is wound up on the winding shaft 41B on the other side.

Then, the winding shaft 41B stops rotating when the winding shaft 41B has wound the predetermined-length separator 7 by a length corresponding to the length of the positive electrode plate 8 or the negative electrode plate 4 as shown in FIG. 4C, thus the center of the predetermined-length separator 7 is positioned in the middle between the winding shafts 41A and 41B, and consequently the separator cassette 27 shown in FIG. 5 is formed where the predetermined-length separator 7 is wound on the separator mount jig 28.

Since the portions assigned by dividing the predetermined-length separator 7 according to the lengths of the positive and negative electrode plates 8 and 4 are respectively wound on the pair of winding shafts 41A and 41B in the separator mount jig 28, and the braking force is applied so as to prevent the individual winding shafts 41A and 41B from rotating unless a tensile force is applied to the separator 7 in the separator cassette 27, the predetermined-length separator 7 is maintained on the individual winding shafts 41A and 41B in a stable wound state without presenting slack, elongation, or crease. As a result, since the separator cassette 27 in this state can be handled as an independent single part, the separator cassette 27 is sequentially transported by a transportation mechanism (not shown) to the group winding head unit 20 shown in FIG. 1 after the separator cassette 27 is taken out from the separator processing mechanism 77. Since the separator cassette 27 is constituted such that the portions almost half as long as the predetermined-length separator 7 are respectively wound on the pair of winding shafts 41A and 41B of the separator mount jig 28 as described above, there is such advantage that the same separator mount jig 28 is shared for constituting the separator cassette 27 among various separators 7 different in length and width corresponding to difference in type and size of batteries.

The following section describes a winding process of the spiral electrode group on the group winding head unit 20. As described above, the positive electrode plate cassette 29 is formed by mounting the positive electrode plate 8 supplied from the positive electrode plate processing mechanism 33 on the positive electrode plate jig 30. The negative electrode plate cassette 31 is transported by the supply conveyer 73 after constituted in the negative electrode processing mechanism 59. The separator cassette 27 is transported after constituted in the separator processing mechanism 77. The positive electrode plate cassette 29, the negative electrode plate cassette 31, and the separator cassette 27 are respectively supplied for the group winding head unit 20 sequentially transported to a predetermined position as the work table 19 in FIG. 1 rotates while these cassettes are presenting a relative positional relationship shown in the perspective view in FIG. 5 and the schematic plan view in FIG. 6. Then, these cassettes are mounted in a state described below.

First, the separator cassette 27 is mounted on the group winding head unit 20 in a state shown in FIG. 5. Namely, the separator cassette 27 is supported while the bottom parts of the pair of winding shafts 41A and 41B are respectively engaged into rotatable bearing bases 83, and simultaneously winding shaft bearing 84 is engaged with the holder recess 42 in the main unit 39. The winding shaft 22 of the group winding head unit 20 comprises a winding core 87 and an auxiliary pin 88. The top end of the winding core 87 is rotatably supported by the winding shaft bearing 84, and simultaneously the bottom end is connected with a drive shaft (not shown) in a support tube 89. When the separator cassette 27 is mounted on the group head unit 20, the winding core 87 comes in contact with the center of the separator 7 between the winding shafts 41A and 41B.

Then, the auxiliary pin 88 rises up from the support tube 89 as an alternate long and two short dashes line in FIG. 5 shows, and consequently the top end of the auxiliary pin 88 is inserted into the winding shaft bearing 84 for being rotatably supported. As a result, the center of the separator 7 is held from the both sides by the winding core 87 and the auxiliary pin 88 of the winding shaft 22. At this moment, a winding shaft support roller 93 attached to a roller support lever 92 rotated and urged by a spring 91 is lightly pressed on the winding shaft 22 as shown in FIG. 6.

Figure 6:
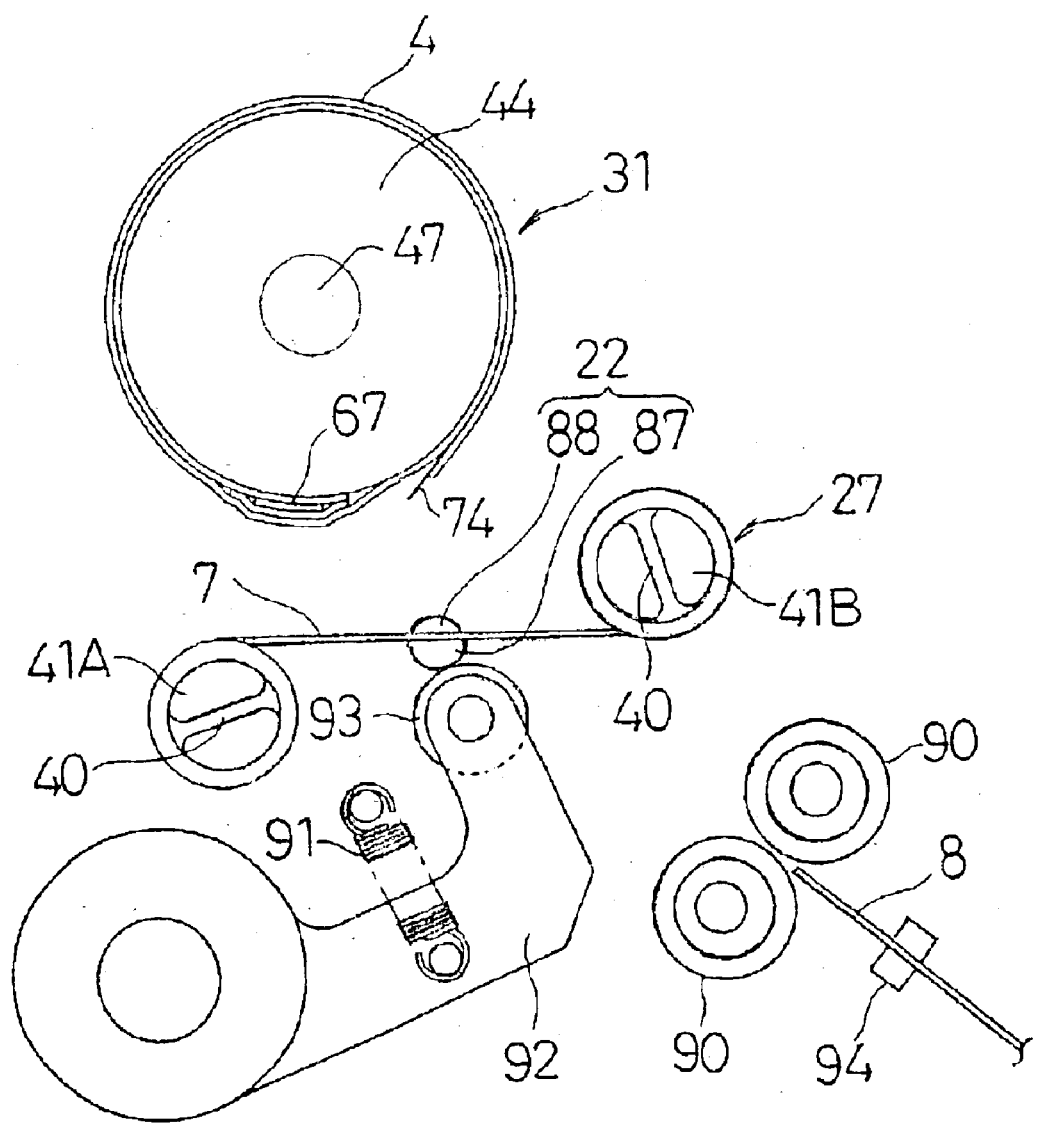
FIG. 6 is a schematic plan view for the state in FIG. 5.

On the other hand, in the positive electrode plate cassette 29, after the positive electrode plate 8 is slidingly moved to the predetermined position toward the group winding head unit 20 while the positive electrode plate 8 is held in the positive electrode plate mount jig 30, the positive electrode plate 8 is magnetically attached to a magnetically attaching pad (a hold pad) 94 shown in FIG. 6, and then is pulled out from the positive electrode plate mount jig 30 to a position below the group winding head unit 20. Since the present embodiment exemplifies a case for constituting the spiral electrode group for a lithium primary battery, the positive electrode plate 8 is constituted by using ferromagnetic stainless steel as the core material, it is possible to magnetically attach the positive electrode plate 8 as described above.

As described above, the positive electrode plate 8 pulled out from the positive electrode plate mount jig 30 is transported to between a pair of feeding guide rollers 90 as shown in FIG. 6 as the magnetically attaching pad 94 moves toward the group winding head unit 20 in parallel with the positive electrode plate mount jig 30. As a result, the positive electrode plate 8 is inserted between portions of the separator 7 to be wound on the winding shaft 22, and then is wound with the separator 7 after the end of the positive electrode plate 8 is passed through between the pair of feeding guide rollers 90 as shown in FIG. 5.

Figure 7:
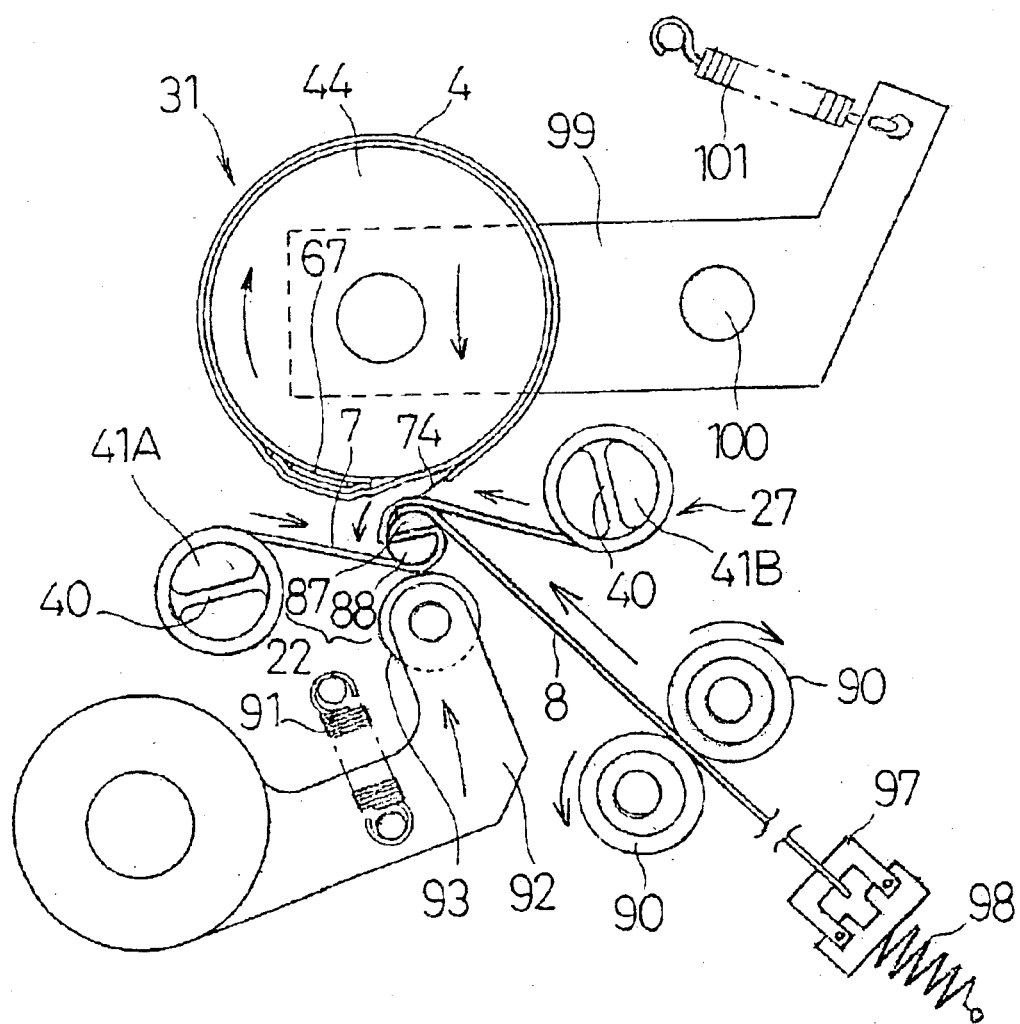
FIG. 7 is a schematic plan view showing a state where a winding shaft is rotated by half a turn in this apparatus.

After the negative electrode plate cassette 31 is transported over a cassette support lever 99 shown in FIG. 7, the bottom support base 49 is engaged downward into a reception part (not shown) on a free end of the cassette support lever 99 supported at a single end at a predetermined timing. As a result, the negative electrode plate cassette 31 is mounted on the group winding head unit 20. The cassette support lever 99 is provided rotatably about a lever support pin 100 in a direction approaching toward/departing from the winding shaft 22, and simultaneously is rotated and urged by a helical spring (an elastic member) 101 suspended on the other end in a direction moving the reception part on the free end toward the winding shaft 22.

Thus, when the negative electrode plate cassette 31 held in the reception part is mounted on the group winding head unit 20, the negative electrode plate 4 wound on the ring 50 of the negative electrode plate cassette 31 is displaced through the cassette support lever 99 rotated and urged by the urging force of the helical spring 101, and consequently is pressed on the winding shaft 22 with a proper force. When the negative electrode plate cassette 31 is displaced, since the action piece 57 comes in contact with the pressing protrusion of the group winding head unit 20, and thus receives a pressing force, the action lever 54 of the negative electrode plate cassette 31 rotates the lock lever 53 outward, thereby releasing the pressure of the lock lever 53 acting on the negative electrode plate 4 wound on the ring 50. As a result, the drum 44 of the negative electrode plate cassette 31 becomes rotatable freely.

Before the positive electrode plate 8 and the negative electrode plate 4 are fed to between portions of the separator 7, the servomotor 21 of the group winding head unit 20 is controlled to rotate by the corresponding servo controller 24, the winding shaft 22 is rotated by the servomotor 21, and then the center of the separator 7 starts being wound on the winding shaft 22 after the separator cassette 27 in the state described above is mounted on the group winding head unit 20. FIG. 7 shows a state where the winding shaft 22 is rotated by half a turn toward a direction indicated by an arrow in the drawing. The positive electrode plate 8 is transported toward the winding shaft 22 by the pair of feeding guide rollers rotated by the control of the serve controller 24, the leading end is positioned to the predetermined position relative to the separator 7, and then the positive electrode plate 8 is wound between portions of the separator 7 to be wound on the winding shaft 22.

On the other hand, the negative electrode plate 4 is pressed on the separator 7 wound on the winding shaft 22 by the control of the serve controller 24 through the cassette support lever 99 rotated and urged by the helical spring 101. At this moment, when the positioning tape 74 adhered on the leading end of the negative electrode plate 4 comes in contact with the separator 7, the adhesive surface on one side of the positioning tape 74 is adhered to the separator 7. As a result, the negative electrode plate 4 is positioned highly precisely with respect to the separator 7, and simultaneously is held to prevent a positional displacement with respect to the separator 7 in a subsequent winding process.

Figure 8A:
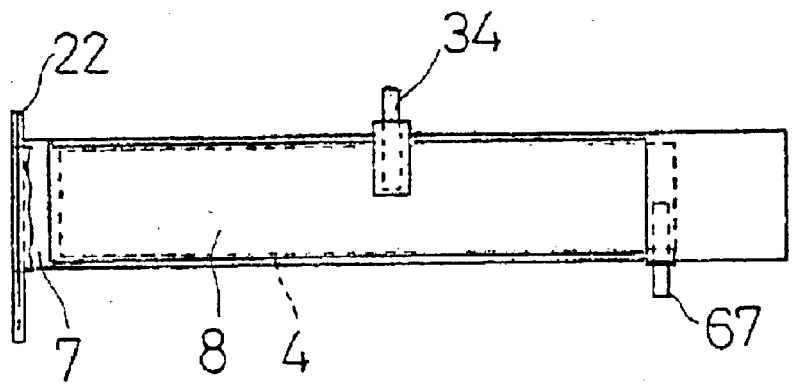
FIG. 8A is a schematic explanatory drawing showing a relative positional relationship among the positive electrode plate, the negative electrode plate, and the separator in a developed state in this apparatus when the winding shaft starts winding.
Figure 8B:
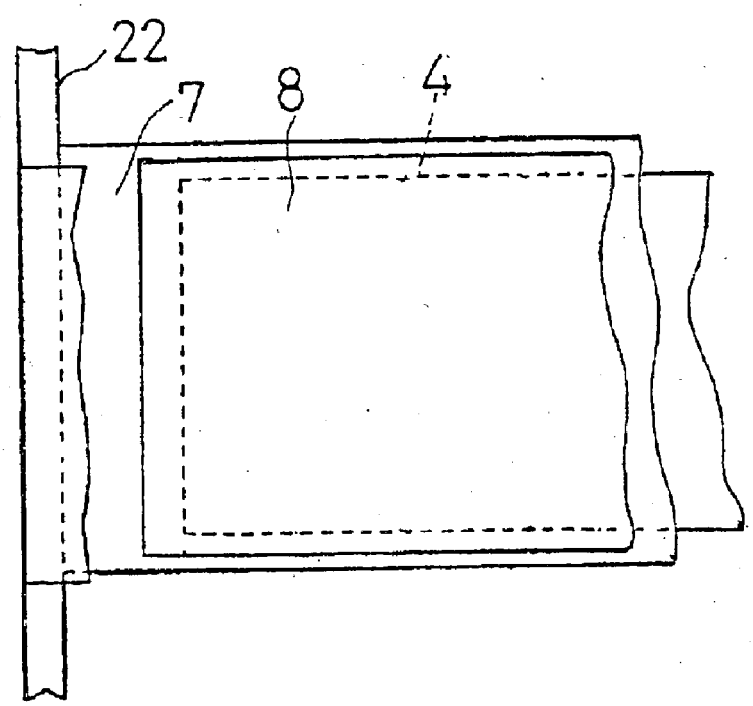
FIG. 8B is an enlarged view of a neighborhood of the winding shaft in FIG. BA.

FIG. 8A is a schematic explanatory drawing showing a developed state of a relative positional relationship among the positive electrode plate 8, the negative electrode plate 4, and the separator 7 when they star being wound on the winding shaft 22. FIG. 8B is an enlarged view of a neighborhood of the winding shaft 22 in FIG. 8A. In the apparatus for manufacturing a spiral electrode group of the present embodiment, since the positive electrode plate 8, the negative electrode plate 4, and the separator 7 are mutually positioned by the control of the servo controller 24 after they are supplied for the group winding head unit 20 while they are mounted in the predetermined arrangement in the respective cassettes 29, 31, and 27 in advance, the positive electrode plate 8, the negative electrode plate 4, and the separator 7 are wound while they are being laminated in an extremely precise mutual positional relationship. As a result of an actual measurement, both positional displacement in the lengthwise direction, and winding displacement in the widthwise direction were within ±0.5 mm for the positive electrode plate 8, the negative electrode plate 4, and the separator 7.

When the winding shaft 22 continues to rotate from the state shown in FIG. 7, since the drum 44 of the negative electrode plate cassette 31 is rotatably supported, but is not connected with a rotationally driving source as described above, the drum 44 is rotated together in synchronism with the winding shaft 22 by the friction force generated by pressing the drum 44 against the winding shaft 22 through the negative electrode plate 4 and the separator 7 at the predetermined pressure by the urging force of the helical spring 101. Thus, since a tensile force is hardly applied to the negative electrode plate 4, though the negative electrode plate 4 is a thin lithium metal foil tape, the negative electrode plate 4 is wound between portions of the separator 7 without presenting elongation.

On the other hand, the leading end of the positive electrode plate 8 is fed into between the pair of feeding guide rollers 90, and then is wound between portions of the separator 7 by the rotational drive of the pair of feeding guide rollers 90 while the trailing end is supported by chucking of the chuck member 97 shown in FIG. 7. Also, since the chuck member 97 is lightly urged toward a direction departing from the group winding head unit 20 by the spring (the elastic member) 98 as shown in FIG. 7, the positive electrode, plate 8 is fed toward the winding shaft 22, and is wound between portions of the separator 7 subsequently while the positive electrode plate 8 is receiving a proper tensile force, and the pair of feeding guide rollers 90 are restricting the transportation direction of the positive electrode plate B. As a result, the positive electrode plate 8 is wound without presenting a displacement with respect to the separator 7, and slack.

In addition, the winding shaft support roller 93 is pressed on the electrode group being wound on the winding shaft 22 by the urging force from the spring 91 so as to surly wind the electrode group tightly without slack, and simultaneously serves along with the drum 44 of the negative electrode plate cassette 31 to hold the winding shaft 22 from the both sides, thereby reducing deflection of the winding shaft 22 as small as possible.

Figure 9:
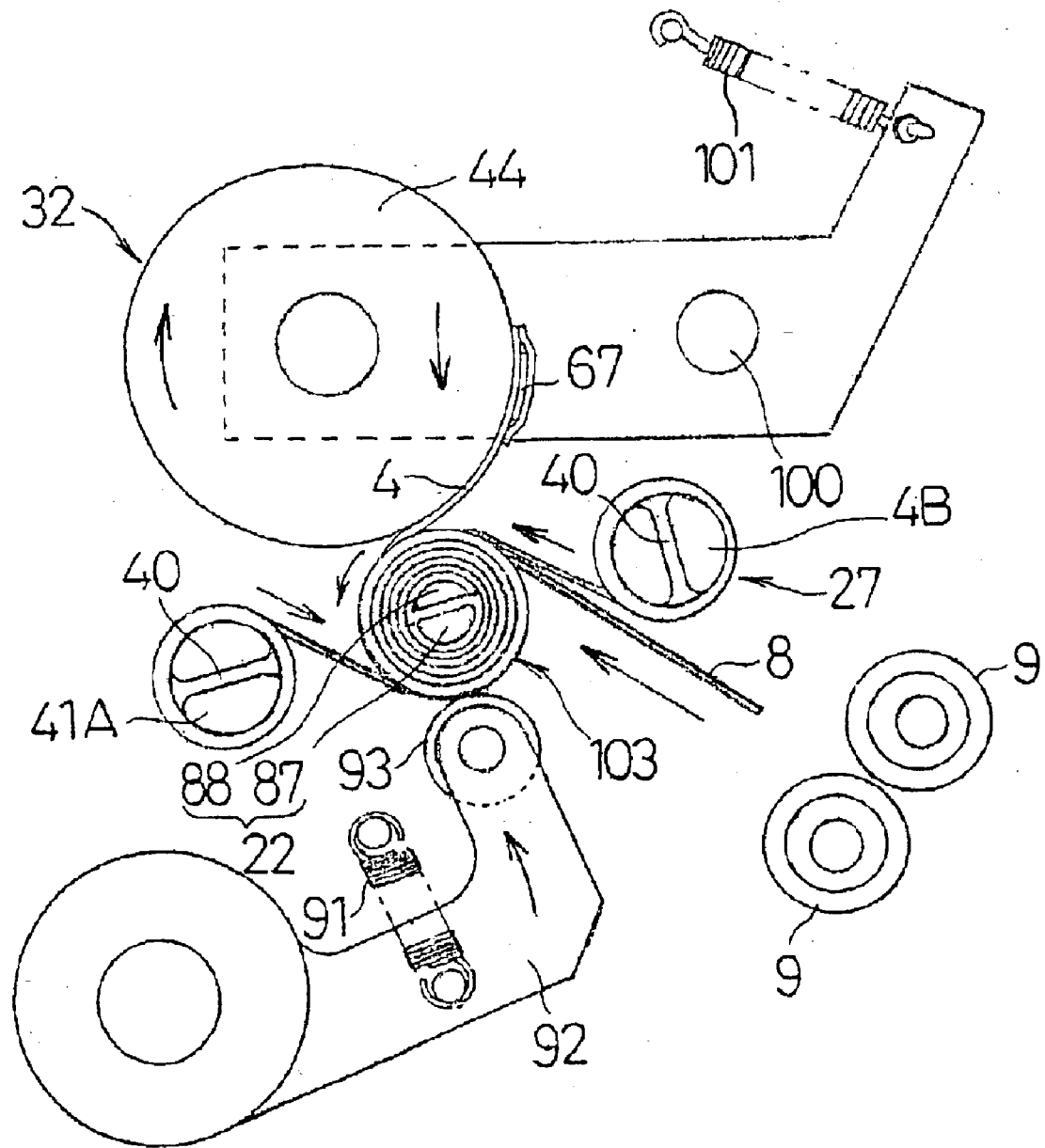
FIG. 9 is a schematic plan view for a state immediately before the completion of manufacturing the spiral-shape electrode group in this apparatus.

FIG. 9 shows a state immediately before the completion of manufacturing the spiral-shape electrode group 103. In this state, the positive electrode plate 8, the negative electrode plate 4, and the separator 7 are wound up on the winding shaft 22 almost completely. At this moment, since the trailing end of the negative electrode plate 4 is sucked by the ring 50 of the drum 44 through the vacuum suction holes 51, and thus the negative electrode plate 4 is surely wound without slack, the entire negative electrode is extremely smoothly wound without crease or displaced wind. The vacuum suction of the vacuum suction holes 51 opposing to the trailing end of the negative electrode plate 4 is released by the control of the servo controller 24 immediately before the negative electrode plate 4 is detached from the ring 50.

Also, since the negative electrode plate cassette 31 is displaced in the direction departing from the winding shaft 22 through the turn of the cassette support lever 99 as the diameter of the spiral electrode group 103 increases, the negative electrode plate 4 is always pressed at an approximately constant pressure directly on the outer peripheral surface of the spiral shape electrode group 103 whose diameter increases as the winding, and thus, the drum 44 rotates together in synchronism with the electrode group 103. Thus, the rotation speed of the drum 44 automatically increases as the diameter of the spiral electrode group 103 increases while the rotation speed of the winding shaft 22 is always constant. As a result, since the feeding speed of the negative electrode plate 4 automatically increases as the diameter of the spiral electrode group 103 increases, and consequently the winding speed increases, the feeding speed is always variably adjusted to a stable optimal value. Thus, since a tensile force is hardly applied to the negative electrode plate 4 made of a thin lithium metal foil tape in the winding process of the spiral electrode group 103, the negative electrode plate 4 is not elongated.

Since the spiral electrode group 103 being wound is wound with a proper tightness by the friction force acting between the winding shaft 22 and the ring 50 of the drum 44 caused by the pressure from the helical spring 101 and the winding shaft support roller 93, the negative electrode plate 4 hardly generates a recess caused by a pressing force acting in the winding of the spiral electrode group 103, or hardly decreases its thickness below a required value.

On the other hand, the chuck member 97 chucking the positive electrode plate 8 releases the chucking immediately before the trailing end of the positive electrode plate 8 is pulled into between the pair of feeding guide rollers 90. The positive electrode plate 8, the negative electrode plate 4, and the separator 7 are entirely wound on the winding shaft after almost a half turn of the work table 19 in FIG. 1, then, the outer periphery tape (not shown) adhered on the one side of the negative electrode plate 4 is finally wound on the outer peripheral surface of the spiral electrode group 103 for preventing slack, and consequently the spiral electrode group 103 is completed.

Figure 11:
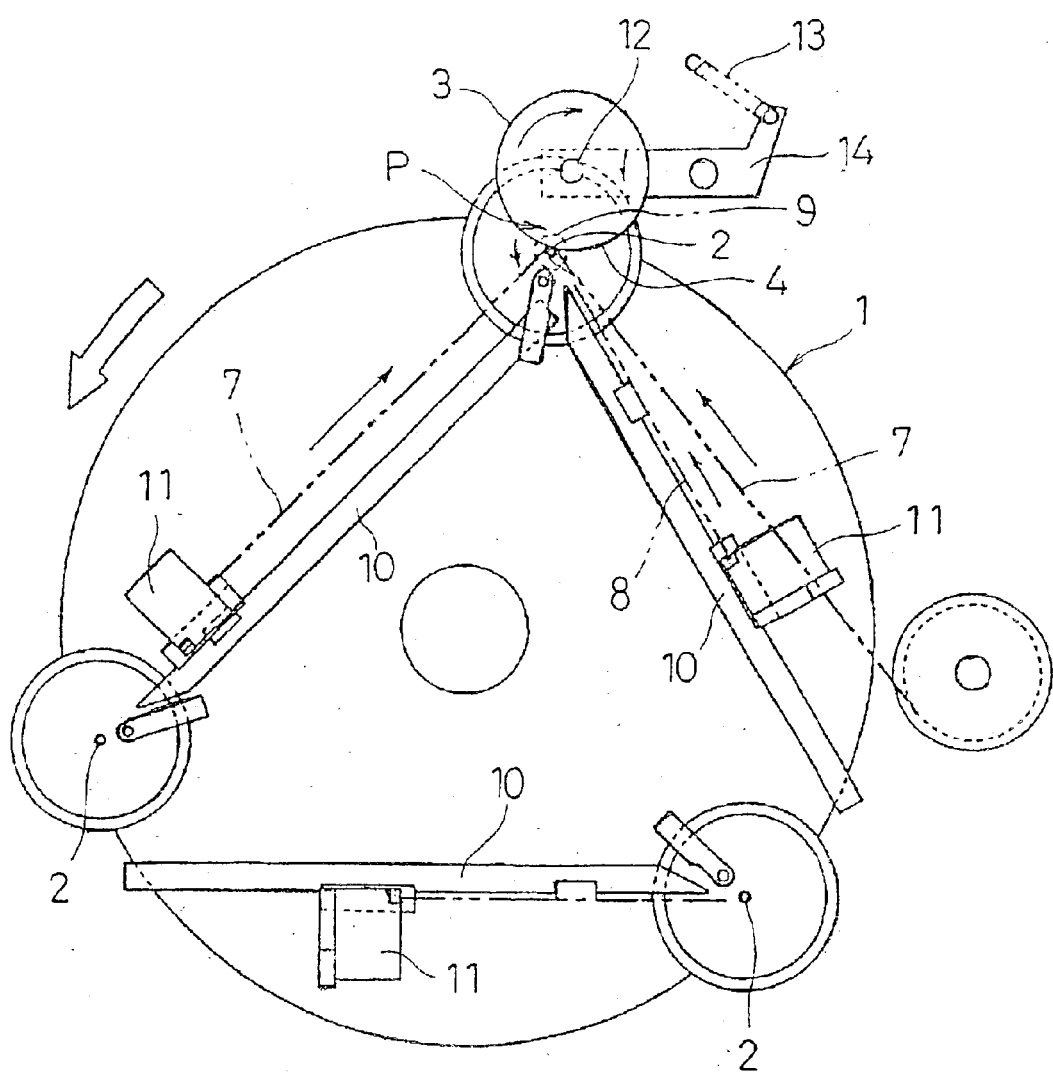
FIG. 11 is a schematic front view showing a conventional apparatus for manufacturing a spiral electrode group.

In this winding process of the spiral electrode group 103, the positive and negative electrode plate cassettes 29 and 31 formed by mounting the positive and negative electrode plates 8 and 4 with the predetermined lengths on the positive and negative electrode plate mount jigs 30 and 32 are constituted in advance in the positive electrode plate processing mechanism 33 and the negative electrode plate processing mechanism 59 separated from the placement location of the group winding head unit 20. Simultaneously, the separator cassette 27 formed by mounting the separator 7 with the predetermined length on the separator mount jig 28 is constituted in the separator processing mechanism 77 separated from the placement location of the group winding head unit 20. Then, these cassettes 29, 31, and 27 are supplied for the group winding head unit 20 to wind them into the spiral shape. Thus, after the group winding head unit 20 receives the supply of the individual cassettes 29, 31, and 27, it is simply necessary for the group winding head unit 20 to constitute the spiral electrode group 103 in a transportation process turning once around the circular transportation path, it is possible to provide a large number of the group winding head units 20 along the outer peripheral end of the work table 19. Therefore, the productively increases remarkably with this manufacturing apparatus compared with the conventional production apparatus shown in FIG. 11 which constitutes the spiral electrode group by conducting winding at a single location.

While the first embodiment described above exemplifies the constitution where the group winding head units 20 are circularly provided along the outer peripheral end of the work table 19, and are circulated along the circular transportation path as the work table 19 rotates, the group winding head units 20 may be circulated along a linear transportation path.

Figure 10:
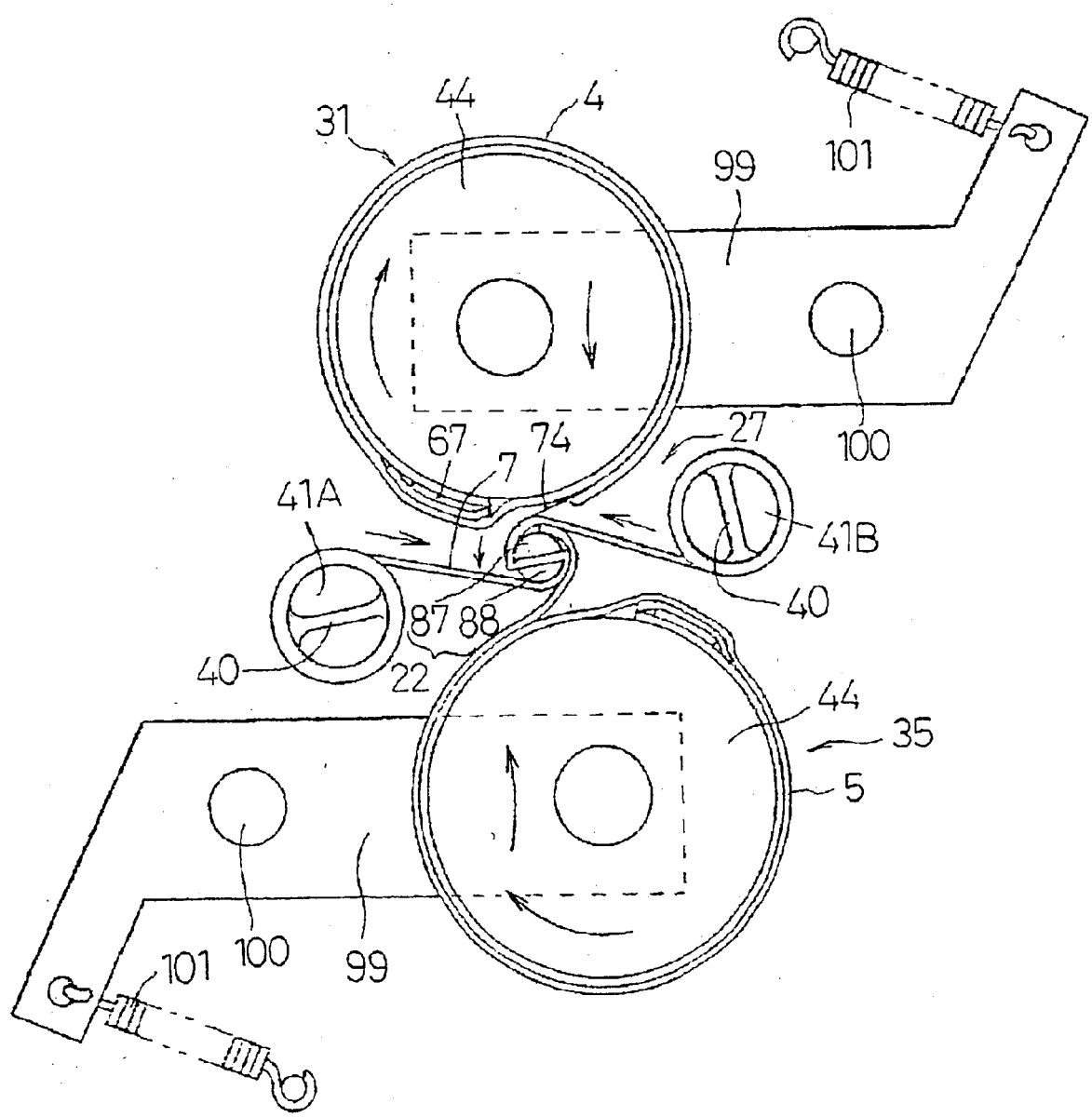
FIG. 10 is a schematic plan view showing a relative positional relationship among a positive electrode plate cassette, a negative electrode plate cassette, and a separator cassette supplied for a group winding head unit for an apparatus for manufacturing a spiral electrode group according to another embodiment of the invention.

Also, while the case where the spiral group electrode 103 is constituted for a lithium primary battery is exemplified in the first embodiment, this apparatus can be applied to a case of manufacturing a spiral electrode group for almost all other batteries such as a lithium ion battery and a nickel-metal hydride battery as in a second embodiment described below, and has a constitution shown in FIG. 10 if it is the case. In this drawing, elements identical to or equivalent to those in FIG. 6 are designated with the same numerals, and description for them is not provided.

In this manufacturing apparatus, while forms same as those in the first embodiment are used as the negative electrode plate cassette 31 and the separator cassette 27, the positive electrode plate 5 is wound on the drum 44, and then is supplied for the group winding head unit 20 as a positive electrode plate cassette 35 as is the negative electrode plate cassette 31 in the first embodiment. Subsequently the electrode group 103 is wound while the negative electrode plate 4 of the negative electrode plate cassette 31 and the positive electrode plate 5 of the positive electrode plate cassette 35 are pressing the separator 7 supplied from the separator cassette 27 from the both sides. Thus, in this manufacturing apparatus, the positive electrode plate cassette 35 is mounted on the cassette support lever 99 held rotatably about the lever support pin 100 as a fulcrum, and is rotated and urged by the helical spring 101 as is the negative electrode plate cassette 31 in the first embodiment. As a result, the winding shaft support roller 93 in the first embodiment is eliminated in this manufacturing apparatus.

When a spiral electrode group for a prismatic battery is constituted, the winding shaft 22 including the winding core 87 and the auxiliary pin 88 should have a square axial section.

INDUSTRIAL APPLICABILITY

With the method and the apparatus for manufacturing a spiral electrode group of the present invention, the individual group winding head units produce spiral electrode groups by winding the positive electrode plate and the negative electrode plate between portions of the separator while the winding shaft is winding the separator in the process where a plurality of group winding head units circulate along the transportation path. Thus, since the spiral electrode groups are simultaneously wound at a plurality of locations, these method and apparatus are proper for increasing the productivity.

Also, since the electrode plate cassette is constituted by winding the electrode plate on the drum, and simultaneously, the separator cassette is constituted by winding respective halves of the separator with the predetermined length on the pair of winding shafts, these method and apparatus are effective for using the same apparatus of electrode plates and separators different in length and width, thereby manufacturing various spiral electrode groups.

What is claimed is:

1. A method for manufacturing a spiral electrode group for a battery by winding a belt-shape positive electrode plate and a belt-shape negative electrode plate in a spiral shape while laminating the positive electrode plate and the negative electrode plate with a separator interposed therebetween, said method comprising:

forming a first plurality of cassettes with a first jig, each cassette containing a length of said positive electrode plate to form a single spiral electrode group;

forming a second plurality of cassettes with a second jig, each cassette containing a length of said negative electrode plate to form a single spiral electrode group;

forming a third plurality of cassettes with a third jig, each cassette containing a length of said separator to form a single spiral electrode group;

each of said first, second and third cassettes being formed mutually independently;

sequentially supplying a plurality of group winding head units circulating along a predetermined transportation path with the positive electrode plate cassette, the negative electrode plate cassette, and the separator cassettes respectively, thereby mounting these cassettes on the head units;

positioning individual ends of the positive electrode plate and the negative electrode plate to predetermined relative positions in the process for circularly transporting said group winding head units, the positive electrode plate and the negative electrode plate respectively supplied from said positive electrode plate cassette and said negative electrode plate cassette to predetermined positions in the lengthwise direction on the both sides of the separator supplied from said separator cassette; and winding the positive electrode plate, the negative electrode plate, and the separator around a rotationally-driven winding shaft of said group winding head unit while the positive electrode plate, the negative electrode plate, and the separator are being laminated.

2. The method for manufacturing a spiral electrode group according to claim 1, wherein the plurality of group winding head units are circulated in one direction along a circular transportation path, and simultaneously the positive electrode plate cassette, the negative electrode plate cassette, and the separator cassette are respectively mounted on the individual group winding head units sequentially transported to a supply position on said transportation path;

the spiral electrode group is delivered to transportation means at a delivery position on said transportation path after the spiral electrode group is wound by said individual group winding head units in the transportation process while the positive electrode plate and the negative electrode plate are being laminated with the separator interposed therebetween; and the individual mount jigs in said positive electrode plate cassette, said negative electrode plate cassette, and said separator cassette are delivered to transportation means at a discharge position on said transportation path after respectively having supplied the positive electrode plate, the negative electrode plate, and the separator.

3. The method for manufacturing a spiral electrode group according to claim 1, wherein at least either one of the positive electrode plate cassette and the negative electrode plate cassette is formed by winding the electrode plate with the predetermined length on an outer peripheral surface of a rotatable drum in one of the electrode plate mount jigs, and then temporarily fixing a wound end of the electrode plate against slack; and the separator cassette respectively winds portions of the separator divided according to the lengths of the positive electrode plate and the negative electrode plate on a pair of rotatable winding shafts provided to the separator cassette, thereby mounting the separator between said pair of winding shafts.

4. The method for manufacturing a spiral electrode group according to claim 3, wherein the separator cassette is constituted by:

passing the separator through individual engagement slits of the pair of winding shafts of the separator mount jig while pulling out the separator from a supply source;

rotationally driving one of the winding shafts for winding up said separator by a length approximately equivalent to that necessary for constituting one spiral electrode group; and cutting a trailing end position of said separator with a cutter, and then driving the other of the winding shaft to wind said separator by a length corresponding to the length of the positive electrode plate or the negative electrode plate from said winding shaft on the one side.

5. An apparatus for manufacturing a spiral electrode group for a battery by winding a belt-shape positive electrode plate and a belt-shape negative electrode plate in a spiral shape while laminating the positive electrode plate and the negative electrode plate with a separator interposed therebetween, said apparatus comprising:

a negative electrode plate cassette formed by winding a negative electrode plate of said belt-shape electrode plates with a predetermined length by multiple turns on an outer peripheral surface of a drum supported rotatably, and simultaneously by maintaining the electrode plate in a wound state on said drum while the electrode plate is locked by a separable lock member in contact with a wound end of the electrode plate against slack;

a positive electrode plate cassette for maintaining a positive electrode plate of said belt-shape electrode plates with the predetermined lengths in a pullable manner;

a separator cassette including a pair of winding shafts rotatably supported in parallel with each other, and maintaining the separator while both ends in the lengthwise direction of the separator with a predetermined length are engaged with engagement slits formed along the shaft center of said pair of individual winding shafts, and simultaneously portions of said separator divided according to the lengths of the positive electrode plate and the negative electrode plate are respectively wound on said pair of winding shafts; and a plurality of group winding head units provided for circulating along a circular transportation path, wherein a spiral electrode group is formed by sequentially mounting said positive electrode plate cassette, said negative electrode plate cassette, and said separator cassette on the individual group winding head units at a supply position on said transportation path, supplying said positive electrode plate and negative electrode plate to predetermined positions on both sides of said separator in contact with a winding shaft of said individual group winding head unit, positioning the ends of said positive electrode plate and negative electrode plate to predetermined relative positions, and winding said positive electrode plate, said negative electrode plate, and said separator on said winding shaft rotationally driven while the positive electrode plate, the negative electrode plate, and the separator are being laminated in a process of circulating said group winding head units on said path.

6. An apparatus for manufacturing a spiral electrode group for a battery by winding a belt-shape positive electrode plate and a belt-shape negative electrode plate in a spiral shape while laminating the positive electrode plate and the negative electrode plate with a separator interposed therebetween, said apparatus comprising:

positive and negative electrode plate cassettes formed by respectively winding the electrode plates with predetermined lengths by multiple turns on outer peripheral surfaces of drums supported rotatably, and simultaneously maintaining the electrode plates in a wound state on said drums while the electrode plates are locked by separable lock members in contact with wound ends of the electrode plates against slack;

a separator cassette including a pair of winding shafts rotatably supported in parallel with each other, and maintaining the separator while both ends in the lengthwise direction of the separator with a predetermined length are engaged with engagement slits formed along the shaft center of said pair of individual winding shafts, and simultaneously portions of said separator divided according to the lengths of the positive electrode plate and the negative electrode plate are respectively wound on said pair of winding shafts; and a plurality of group winding head units provided for circulating along a circular transportation path, wherein a spiral electrode group is formed by sequentially mounting said positive electrode plate cassette said negative electrode plate cassette, and said separator cassette on the individual group winding head units at a supply position on said transportation path, supplying said positive electrode plate and negative electrode plate to predetermined positions on both sides of said separator in contact with a winding shaft of said individual group winding head unit, positioning the ends of said positive electrode plate and negative electrode plate to predetermined relative positions, and winding said positive electrode plate, said negative electrode plate, and said separator on said winding shaft rotationally driven while the positive electrode plate, the negative electrode plate, and the separator are being laminated in a process of circulating said group winding head units on said path.

7. The apparatus for manufacturing a spiral electrode group according to claim 5 or 6, wherein a bottom end of the winding shaft of the group winding head unit is connected with a driving source in a support tube, a top end of the winding shaft is rotatably supported by a winding shaft bearing, and the winding shaft comprises a winding core in contact with a predetermined middle position in the lengthwise direction of the separator supplied from the separator cassette mounted on said group winding head unit, and an auxiliary pin protruding from said support tube after the winding core comes in contact with the separator, and then holding the predetermined middle position in the lengthwise direction of said separator from both sides along with said winding core.

8. The apparatus for manufacturing a spiral electrode group according to claim 5, wherein each of the group winding head units comprises:

a motor for rotationally driving the winding shaft; and a controller for respectively controlling the operation of the positive electrode plate cassette, the negative electrode plate cassette, and the separator cassette mounted on said group winding head unit, and for controlling the rotation of said motor, said group winding head unit is constituted such that said controller controls said motor to start rotation of said winding shaft when the winding shaft comes in contact with the separator in said separator cassette, controls to bring the negative electrode plate wound on the drum of the negative electrode plate cassette in contact with said separator wound on said winding shaft with a predetermined pressure, thereby adhering a positioning tape provided at the leading end of said negative electrode plate to said separator with adhesiveness of the positioning tape, and feeds the end of the positive electrode plate pulled out from the positive electrode plate cassette between said winding shaft and said separator wound on said winding shaft, and a friction force acting between said negative electrode plate and said separator rotates said drum together in synchronism with said winding shaft.

9. The apparatus for manufacturing a spiral electrode group according to claim 5, wherein the negative electrode plate cassette for winding the negative electrode plate includes a support shaft rotatably supported between a pair of facing support bases, said support shaft externally engaging the drum for winding said electrode plate on the outer peripheral surface, thereby rotatably supporting the drum between said support bases, a lock lever pressed by an elastic member against the wound end of said electrode plate wound on said drum, and an action piece protruded from the lock lever for receiving a rotation force toward a direction departing from said drum when said negative electrode plate cassette is mounted on the group winding head unit; and said group winding head unit includes a cassette support lever for mounting said negative electrode plate cassette on one end, said cassette support lever rotating about a lever support pin as a fulcrum, and an elastic member suspended on the other end of this cassette support lever, said elastic member for rotating and urging said cassette support lever so as to press the electrode plate wound on the drum of said negative electrode plate cassette against the winding shaft or the separator wound on the winding shaft.

10. The apparatus for manufacturing a spiral electrode group according to claim 5, wherein the positive electrode plate cassette includes a constitution for holding the positive electrode plate in an electrode plate mount jig, and for sliding said positive electrode plate to a predetermined position close to the group winding head unit; and said group winding head unit includes: a holding pad for extracting said positive electrode plate from said electrode plate mount jig while holding said positive electrode plate slid to said predetermined position, and then inserting the end of said positive electrode plate between a pair of feeding guide rollers; a chuck member for chucking to hold said positive electrode plate held by the holding pad; and an elastic member for urging said chuck member toward a backward direction of said chuck member.

11. The apparatus for manufacturing a spiral electrode group according to claim 5, further comprising:

a positive electrode plate processing mechanism, a negative electrode plate processing mechanism, and a separator processing mechanism for respectively constituting the positive electrode plate cassette the negative electrode plate cassette, and the separator cassette by respectively mounting or winding the positive electrode plate, the negative electrode plate, and the separator with the predetermined lengths on a positive electrode plate mount jig, a negative electrode plate mount jig, and a separator mount jig; and a work table including the plurality of group winding head units along a circular outer peripheral end thereof, and being rotated to circulate the individual group winding head units along the circular transportation path, wherein said transportation path includes the supply position for mounting the positive electrode plate cassette, the negative electrode plate cassette, and the separator cassette respectively transported from the positive electrode plate processing mechanism, the negative electrode plate processing mechanism, and the separator processing mechanism on said individual group winding head units, and a discharge position for transporting the empty positive electrode plate mount jigs, negative electrode plate mount jig, and separator mount jig respectively having supplied the positive electrode plate, the negative electrode plate, and the separator to transportation mechanisms for transporting to said individual processing mechanisms.

12. The apparatus for manufacturing a spiral electrode group according to claim 6, wherein each of the group winding head units comprises:

a motor for rotationally driving the winding shaft; and a controller for respectively controlling the operation of the positive electrode plate cassette, the negative electrode plate cassette, and the separator cassette mounted on said group winding head unit, and for controlling the rotation of said motor, said group winding unit is constituted such that said controller controls said motor to start rotation of said winding shaft when the winding shaft comes in contact with the separator in said separator cassette, and controls to bring the positive electrode plate and the negative electrode plate wound on the drums of the pair of electrode plate cassettes in contact with said separator wound on said winding shaft with a predetermined pressure, thereby adhering positioning tapes provided at the ends of said electrode plates to said separator with adhesiveness of the positioning tapes, and friction force acting between said electrode plates and said separator rotates said drums together with said winding shaft.

13. The apparatus for manufacturing a spiral electrode group according to claim 6, wherein the pair of electrode plate cassettes for respectively winding the positive electrode plate and the negative electrode plate includes: a support shaft rotatably supported between a pair of facing support bases, said support shaft externally engaging the drum for winding said electrode plate on the outer peripheral surface, thereby rotatably supporting the drum between said support bases; a lock lever pressed by an elastic member against the wound end of said electrode plate wound on said drum; and an action piece protruded from the lock lever for receiving a rotation force toward a direction departing from said drum when said electrode plate cassettes are mounted on the group winding head units, and said group winding head unit includes: a plurality of cassette support levers for mounting said electrode plate cassette on one end, said cassette support lever rotating about a lever support pin as a fulcrum; and elastic members individually suspended on the other end of the plurality of cassette support levers, said elastic members for rotating and urging said cassette support levers so as to press the electrode plates wound on the drum of said electrode plate cassettes against the winding shaft or the separator wound on the winding shaft.

14. The apparatus for manufacturing a spiral electrode group according to claim 6, further comprising:

a positive electrode plate processing mechanism, a negative electrode plate processing mechanism, and a separator processing mechanism for respectively constituting the positive electrode plate cassette, the negative electrode plate cassette, and the separator cassette by respectively mounting or winding the positive electrode plate, the negative electrode plate, and the separator with the predetermined lengths on a positive electrode plate mount jig, a negative electrode plate mount jig, and a separator mount jigs; and a work table including the plurality of group winding head units along a circular outer peripheral end thereof, and being rotated to circulate the individual group winding head units along the circular transportation path, wherein said transportation path includes the supply position for mounting the positive electrode plate cassette, the negative electrode plate cassette, and the separator cassette respectively transported from the positive electrode plate processing mechanism, the negative electrode plate processing mechanism, and the separator processing mechanism on said individual group winding head units, and a discharge position for transporting the empty positive electrode plate mount jig, negative electrode plate mount jig, and separator mount jig respectively having supplied the positive electrode plate, the negative electrode plate, and the separator to transportation mechanisms for transporting to said individual processing mechanisms.

15. The apparatus for manufacturing a spiral electrode group according to claim 11 or 14, wherein the separator processing mechanism includes:

a tensioning member for applying a required tension to the separator fed out from a supply source, and being held by guide members at the leading end thereof;

a pair of driving shafts to be connected with the pair of winding shafts for transmitting rotation when the separator mount jig is held at a predetermined position;

a chuck member for passing the separator through the individual engagement slits of said pair of the winding shafts while pulling out the separator held by said guide members after chucking the end of the separator; and a cutter for cutting said separator, and one of the winding shafts driven rotationally winds said separator by a length approximately corresponding to a length required for constituting one spiral electrode group after the separator is passed through the individual engagement slits of said pair of the winding shafts, said cutter cuts said separator at a neighborhood close to the position held by said guide members, and then the other of the winding shafts driven rotationally winds said separator by a length approximately corresponding to a length of the positive electrode plate or the negative electrode plate from said one winding shaft.

16. A method for manufacturing a spiral electrode group for a battery by winding a belt-shape positive electrode plate and a belt-shape negative electrode plate in a spiral shape while laminating the positive electrode plate and the negative electrode plate with a separator interposed therebetween, said method comprising:

constituting a positive electrode plate cassette, a negative electrode plate cassette, and a separator cassette by mounting the positive electrode plate, the negative electrode plate, and the separator with lengths necessary for constituting one spiral electrode group respectively on a positive electrode plate mount jig, a negative electrode plate mount jig, and a separator mount jig for pulling out, or for winding;

sequentially supplying a plurality of group winding head units circulating along a predetermined transportation path with the positive electrode plate cassette, the negative electrode plate cassette, and the separator cassette respectively, thereby mounting these cassettes on the head units;

positioning individual ends of the positive electrode plate and the negative electrode plate to predetermined relative positions in the process for circularly transporting said group winding head units, the positive electrode plate and the negative electrode plate respectively supplied from said positive electrode plate cassette and said negative electrode plate cassette to predetermined positions in the lengthwise direction on the both sides of the separator supplied from said separator cassette;

winding the positive electrode plate, the negative electrode plate, and the separator around a rotationally-driven winding shaft of said group winding head unit while the positive electrode plate, the negative electrode plate, and the separator are being laminated;

the plurality of group winding head units are circulated in one direction along a circular transportation path, and simultaneously the positive electrode plate cassette, the negative electrode plate cassette, and the separator cassette are respectively mounted on the individual group winding head units sequentially transported to a supply position on said transportation path;

the spiral electrode group is delivered to transportation means at a delivery position on said transportation path after the spiral electrode group is wound by said individual group winding head units in the transportation process while the positive electrode plate and the negative electrode plate are being laminated with the separator interposed therebetween; and the individual mount jigs in said positive electrode plate cassette, said negative electrode plate cassette, and said separator cassette are delivered to transportation means at a discharge position on said transportation path after respectively having supplied the positive electrode plate, the negative electrode plate, and the separator.

17. A method for manufacturing a spiral electrode group for a battery by winding a belt-shape positive electrode plate and a belt-shape negative electrode plate in a spiral shape while laminating the positive electrode plate and the negative electrode plate with a separator interposed therebetween, said method comprising:

constituting a positive electrode plate cassette, a negative electrode plate cassette, and a separator cassette by mounting the positive electrode plate, the negative electrode plate, and the separator with lengths necessary for constituting one spiral electrode group respectively on a positive electrode plate mount jig, a negative electrode plate mount jig, and a separator mount jig for pulling out, or for winding;

sequentially supplying a plurality of group winding head units circulating along a predetermined transportation path with the positive electrode plate cassette, the negative electrode plate cassette, and the separator cassette respectively, thereby mounting these cassettes on the head units;

positioning individual ends of the positive electrode plate and the negative electrode plate to predetermined relative positions in the process for circularly transporting said group winding head units, the positive electrode plate and the negative electrode plate respectively supplied from said positive electrode plate cassette and said negative electrode plate cassette to predetermined positions in the lengthwise direction on the both sides of the separator supplied from said separator cassette;

winding the positive electrode plate, the negative electrode plate, and the separator around a rotationally-driven winding shaft of said group winding head unit while the positive electrode plate, the negative electrode plate, and the separator are being laminated;

at least either one of the positive electrode plate cassette and the negative electrode plate cassette is formed by winding the electrode plate with the predetermined length on an outer peripheral surface of a rotatable drum in one of the electrode plate mount jigs, and then temporarily fixing a wound end of the electrode plate against slack; and the separator cassette respectively winds portions of the separator divided according to the lengths of the positive electrode plate and the negative electrode plate on a pair of rotatable winding shafts provided to the separator cassette, thereby mounting the separator between said pair of winding shafts.

18. The method for manufacturing a spiral electrode group according to claim 17, wherein the separator cassette is constituted by:

passing the separator through individual engagement slits of the pair of winding shafts of the separator mount jig while pulling out the separator from a supply source;

rotationally driving one of the winding shafts for winding up said separator by a length approximately equivalent to that necessary for constituting one spiral electrode group; and cutting trailing end position of said separator with a cutter, and then driving the other of the winding shaft to wind said separator by a length corresponding to the length of the positive electrode plate or the negative electrode plate from said winding shaft on the one side.

* * * * *